US012467192B2

United States Patent
Vita et al.

(10) Patent No.: US 12,467,192 B2
(45) Date of Patent: Nov. 11, 2025

(54) LAUNDRY TREATING APPLIANCE HAVING A VAPOR AND/OR MIST AND/OR AEROSOL GENERATOR

(71) Applicant: Electrolux Appliances Aktiebolag, Stockholm (SE)

(72) Inventors: Giuseppe Vita, Porcia (IT); Paola Rovella, Porcia (IT); Giuseppe Rossi, Porcia (IT); Nicola Reid, Porcia (IT); Emilio Santoro, Porcia (IT); Elisabetta Bari, Porcia (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 660 days.

(21) Appl. No.: 17/777,125

(22) PCT Filed: Nov. 18, 2019

(86) PCT No.: PCT/EP2019/081664
§ 371 (c)(1),
(2) Date: May 16, 2022

(87) PCT Pub. No.: WO2021/098942
PCT Pub. Date: May 27, 2021

(65) Prior Publication Data
US 2022/0396907 A1 Dec. 15, 2022

(51) Int. Cl.
*D06F 39/40* (2024.01)
*B05B 17/06* (2006.01)
(Continued)

(52) U.S. Cl.
CPC .......... *D06F 39/40* (2024.01); *B05B 17/0676* (2013.01); *D06F 25/00* (2013.01);
(Continued)

(58) Field of Classification Search
CPC .......... D06F 39/40; D06F 34/10; D06F 25/00; D06F 37/04; D06F 37/06; D06F 39/02;
(Continued)

(56) References Cited

U.S. PATENT DOCUMENTS 1,902,193 A 3/1933 Stoddard
3,878,721 A 4/1975 Nath
(Continued)

FOREIGN PATENT DOCUMENTS

CN 101079569 A 11/2007
CN 101153456 A 4/2008
(Continued)

OTHER PUBLICATIONS

Chinese Office Action with Search Report for Chinese Application No. 201980102232.9, dated Apr. 26, 2023 with translation, 28 pages.
(Continued)

*Primary Examiner* — David G Cormier
(74) *Attorney, Agent, or Firm* — Bradley Arant Boult Cummings LLP

(57) ABSTRACT

A laundry washing machine comprising: a cabinet, a washing tub housed inside the cabinet, a tubular mantle rotatably housed inside the cabinet, an electric additive treating device mounted in/on the tubular mantle and configured for treating a washing and/or rinsing additive loaded within the tubular mantle in such a way to generate within the tubular mantle a solution of washing and/or rinsing additive water.

22 Claims, 14 Drawing Sheets

(51) Int. Cl.
| | |
|---|---|
| *D06F 25/00* | (2006.01) |
| *D06F 34/10* | (2020.01) |
| *D06F 37/04* | (2006.01) |
| *D06F 39/06* | (2006.01) |
| *D06F 58/20* | (2006.01) |
| *H05B 3/20* | (2006.01) |
| *D06F 103/62* | (2020.01) |
| *H02J 50/10* | (2016.01) |
| *H02J 50/40* | (2016.01) |

(52) U.S. Cl.
CPC .............. *D06F 34/10* (2020.02); *D06F 37/04* (2013.01); *D06F 39/06* (2013.01); *D06F 58/203* (2013.01); *H05B 3/20* (2013.01); *D06F 2103/62* (2020.02); *H02J 50/10* (2016.02); *H02J 50/40* (2016.02); *H05B 2203/021* (2013.01)

(58) Field of Classification Search
CPC ...... D06F 39/022; D06F 39/024; D06F 39/04; D06F 39/06; D06F 58/203; D06F 58/44; D06F 2103/60; D06F 2103/62; D06F 2105/10; D06F 2105/28; D06F 2105/38; D06F 2105/40
See application file for complete search history.

(56) References Cited

U.S. PATENT DOCUMENTS

| | | | |
|---|---|---|---|
| 4,207,683 A * | 6/1980 | Horton ............ | D06F 58/203 34/597 |
| 5,318,705 A | 6/1994 | Pellerin | |
| 5,463,821 A * | 11/1995 | Gauer ............ | H05B 6/80 219/679 |
| 5,813,253 A | 9/1998 | Uhlin | |
| 8,336,338 B2 | 12/2012 | Cimetta et al. | |
| 9,347,165 B2 | 5/2016 | Kim et al. | |
| 9,951,465 B1 | 4/2018 | Herschler et al. | |
| 11,168,430 B2 | 11/2021 | Park et al. | |
| 2003/0061842 A1 | 4/2003 | Ryu et al. | |
| 2004/0118168 A1 | 6/2004 | Woo et al. | |
| 2004/0123490 A1* | 7/2004 | Pancheri ............ | D06F 58/203 34/597 |
| 2004/0134094 A1 | 7/2004 | Hahn et al. | |
| 2005/0097926 A1 | 5/2005 | Kim et al. | |
| 2005/0210603 A1 | 9/2005 | Houser et al. | |
| 2005/0268669 A1* | 12/2005 | Ko ................. | D06F 37/065 68/140 |
| 2006/0081018 A1 | 4/2006 | Kim | |
| 2007/0113595 A1 | 5/2007 | Harwood et al. | |
| 2008/0053166 A1 | 3/2008 | Lim | |
| 2008/0317688 A1 | 12/2008 | Doyle et al. | |
| 2011/0154678 A1 | 6/2011 | Lee | |
| 2011/0162224 A1 | 7/2011 | Bae et al. | |
| 2012/0192362 A1 | 8/2012 | Lee et al. | |
| 2013/0314897 A1 | 11/2013 | Dal Ben et al. | |
| 2014/0355247 A1 | 12/2014 | Jus et al. | |
| 2014/0366589 A1 | 12/2014 | Park et al. | |
| 2015/0225887 A1* | 8/2015 | Schulze .......... | D06F 39/40 8/137 |
| 2016/0330572 A1 | 11/2016 | Kropp et al. | |
| 2017/0096760 A1 | 4/2017 | Borlin et al. | |
| 2018/0266030 A1 | 9/2018 | Kwon et al. | |
| 2020/0263343 A1 | 8/2020 | Liu et al. | |

FOREIGN PATENT DOCUMENTS

| | | |
|---|---|---|
| CN | 201047684 Y | 4/2008 |
| CN | 101400842 A | 4/2009 |
| CN | 201325442 Y | 10/2009 |
| CN | 103261506 A | 8/2013 |
| CN | 104131438 A | 11/2014 |
| CN | 104781462 A | 7/2015 |
| CN | 106245279 A | 12/2016 |
| CN | 106835621 A | 6/2017 |
| CN | 107541888 A | 1/2018 |
| CN | 107541905 A | 1/2018 |
| CN | 207812118 U | 9/2018 |
| CN | 109737073 A | 5/2019 |
| CN | 110318220 A | 10/2019 |
| DE | 4104450 A1 | 8/1992 |
| EP | 0351671 A1 | 1/1990 |
| EP | 0503999 A1 | 9/1992 |
| EP | 1167609 A1 | 1/2002 |
| EP | 2270272 A1 | 1/2011 |
| EP | 2302125 A1 | 3/2011 |
| EP | 2604740 A1 | 6/2013 |
| EP | 2719818 A1 | 4/2014 |
| EP | 2955263 A1 | 12/2015 |
| EP | 2990519 A1 | 3/2016 |
| EP | 3378982 A1 | 9/2018 |
| EP | 3388569 A1 | 10/2018 |
| EP | 3441512 A1 | 2/2019 |
| EP | 3594402 A1 | 1/2020 |
| FR | 2695657 A1 | 3/1994 |
| JP | 0433689 A | 2/1992 |
| JP | 2005021505 A | 1/2005 |
| JP | 2005177331 A | 7/2005 |
| JP | 2007159892 A | 6/2007 |
| JP | 2017127402 A | 7/2017 |
| KR | 100798779 B1 | 1/2008 |
| KR | 20130114482 A | 10/2013 |
| WO | 9000641 A1 | 1/1990 |
| WO | 2007063368 A1 | 6/2007 |
| WO | 2009061325 A1 | 5/2009 |
| WO | 2013022164 A2 | 2/2013 |
| WO | 2016182540 A1 | 11/2016 |
| WO | 2018045955 A1 | 3/2018 |
| WO | 2018091717 A1 | 5/2018 |
| WO | 2018184734 A1 | 10/2018 |
| WO | 2018236155 A1 | 12/2018 |
| WO | 2019223849 A1 | 11/2019 |
| WO | 2019223850 A1 | 11/2019 |

OTHER PUBLICATIONS

Chinese Office Action for Chinese Application No. 201880093598.X, dated Sep. 5, 2022 with translation, 19 pages.
Korean Request for the Submission of an Opinion for Korean Application No. 10-20207032957, dated Sep. 17, 2022 with translation, 12 pages.
Chinese Office Action with Search Report for Chinese Application No. 201980102188.1, dated Apr. 26, 2023 with translation, 24 pages.
Korean Request for the Submission of an Opinion for Korean Application No. 10-2020-7033385, dated Mar. 30, 2023 with translation, 19 pages.
International Search Report and Written Opinion for International Application No. PCT/EP2020/053358, dated May 11, 2020, 9 pages.
International Search Report and Written Opinion for International Application No. PCT/EP2017/079819, dated Feb. 23, 2018—9 pages.
International Search Report and Written Opinion for International Application No. PCT/EP2018/063258, dated Feb. 4, 2019, 10 pages.
International Search Report and Written Opinion for International Application No. PCT/EP2018/063259, dated Feb. 5, 2019, 10 pages.
International Search Report and Written Opinion for International Application No. PCT/EP2020/025278, dated Sep. 30, 2020, 15 pages.
Chinese Office Action with Search Report for Chinese Application No. 201980103036.3, dated May 18, 2023 with translation, 21 pages.
English Translation of Chinese Office Action with Search Report for Chinese Application No. 202080052935.8, dated May 24, 2023, 14 pages.

(56) References Cited

OTHER PUBLICATIONS

International Search Report and Written Opinion for International Application No. PCT/EP2019/081664, dated Feb. 5, 2020, 10 pages.
International Search Report and Written Opinion for International Application No. PCT/EP2019/081666, dated Feb. 13, 2020, 11 pages.
International Search Report and Written Opinion for International Application No. PCT/EP2019/081667, dated Feb. 5, 2020, 10 pages.
Chinese Office Action with Search Report for Chinese Application No. 201880093070.2, dated Aug. 31, 2023 with translation, 21 pages.
Non Final Office Action for U.S. Appl. No. 17/777,121, mailed Sep. 22, 2023, 20 pages.
Non Final Office Action for U.S. Appl. No. 17/777,124, mailed Sep. 22, 2023, 19 pages.

* cited by examiner

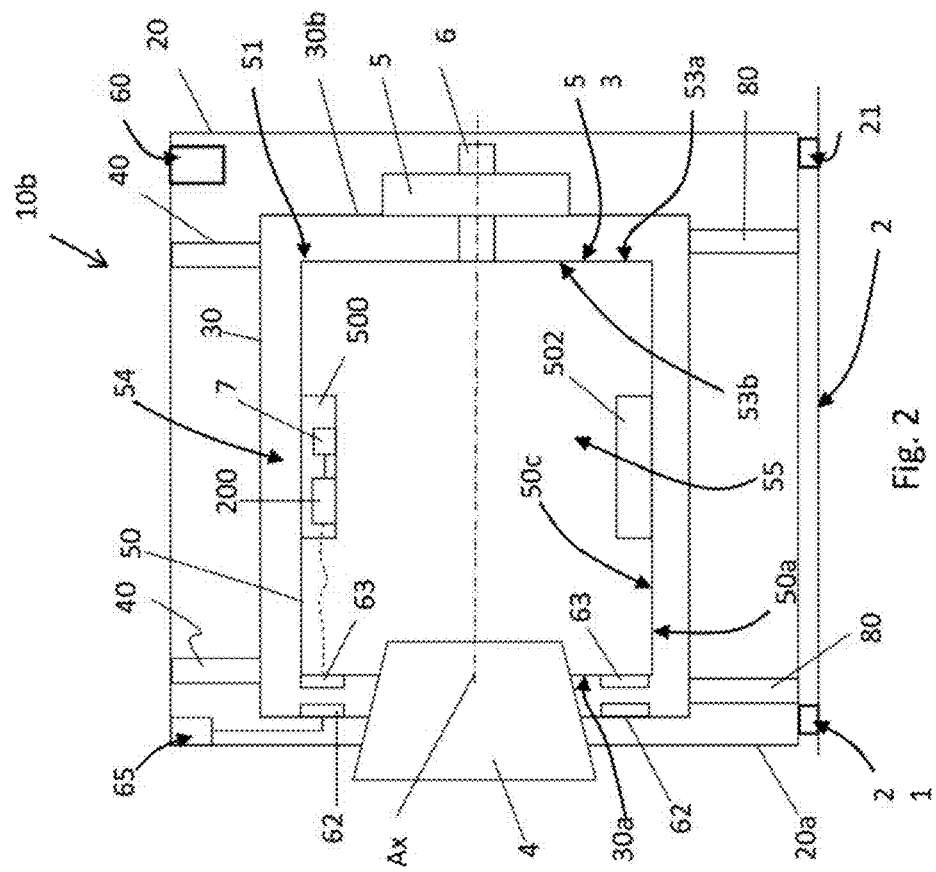
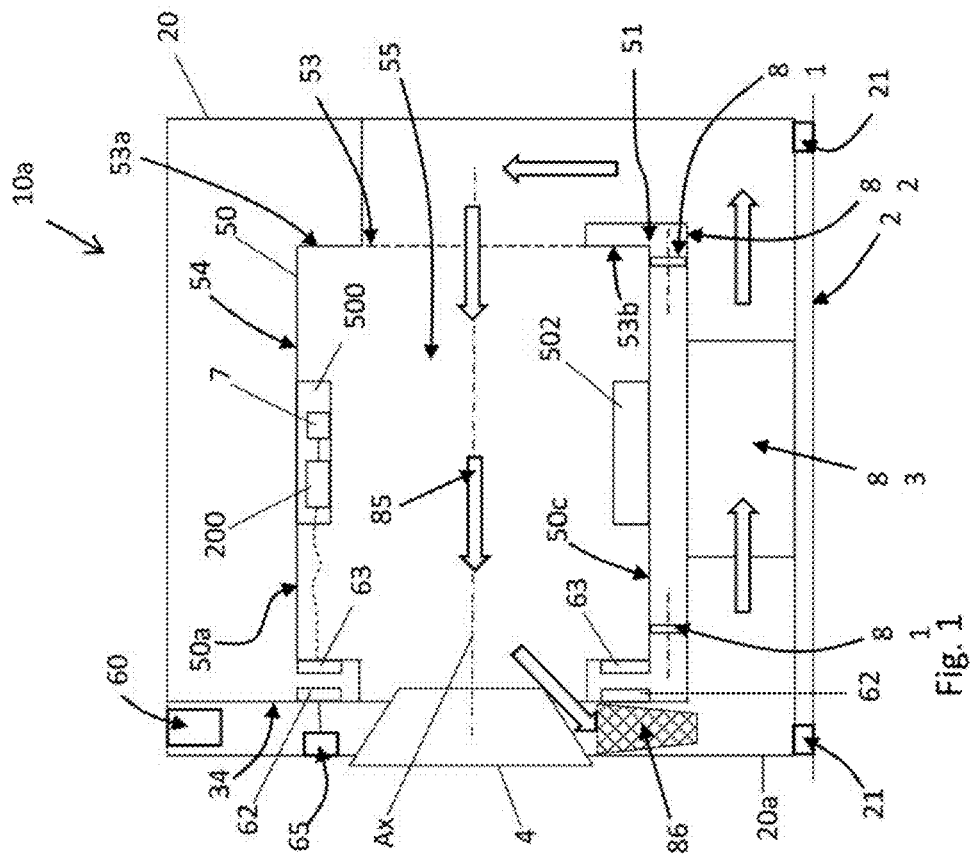

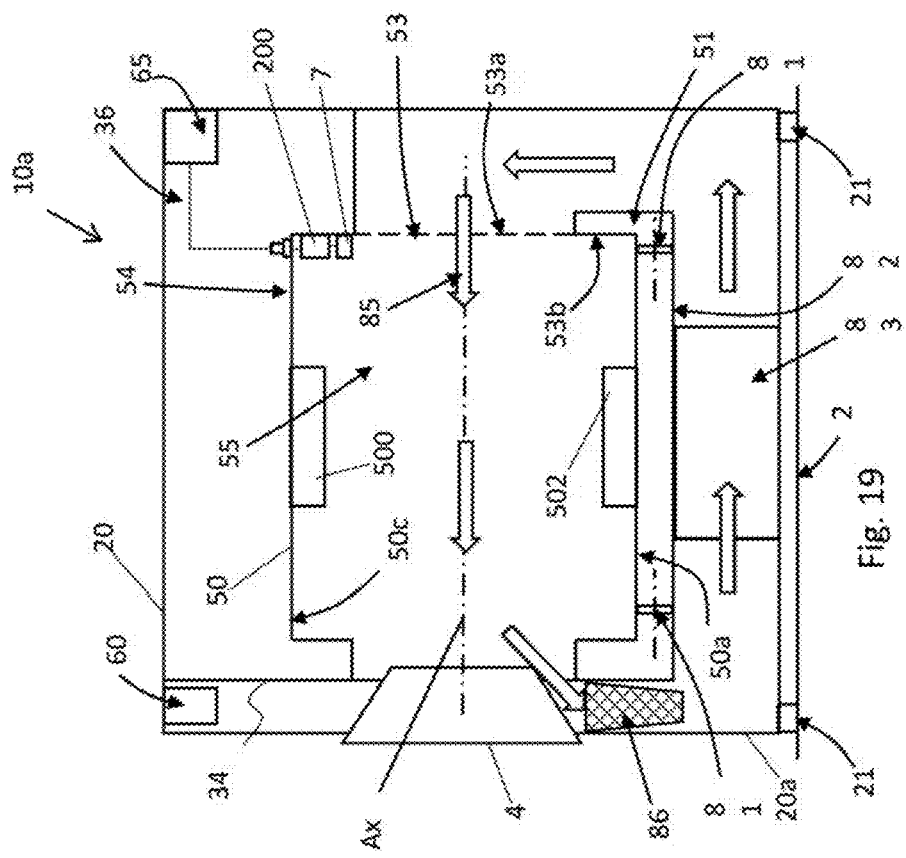
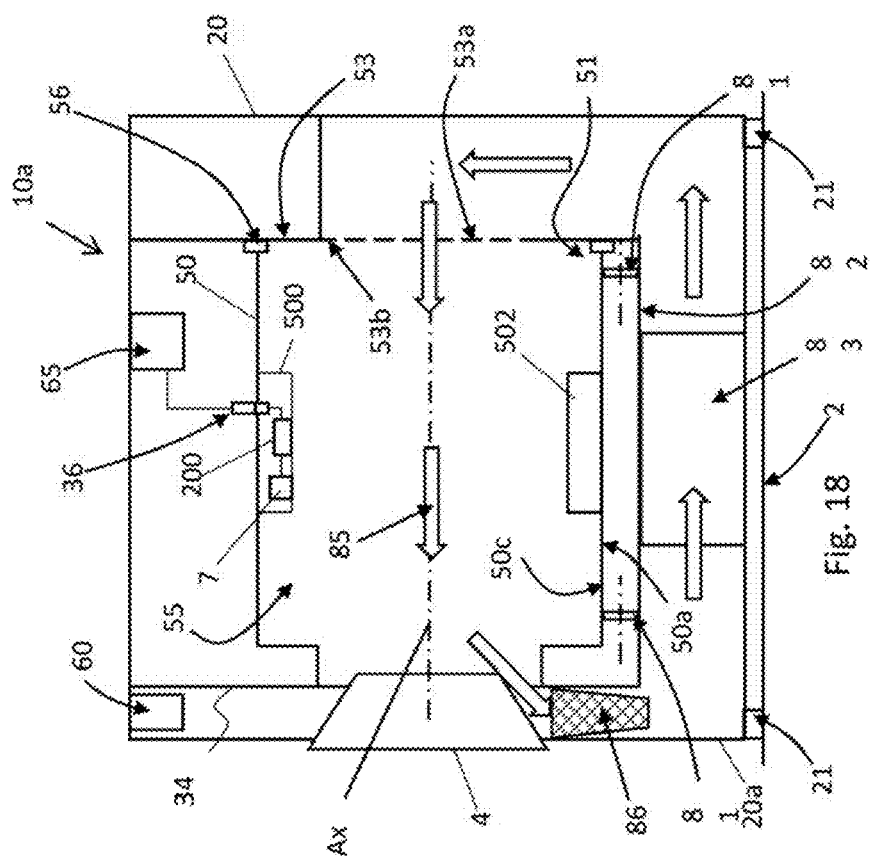

LAUNDRY TREATING APPLIANCE HAVING A VAPOR AND/OR MIST AND/OR AEROSOL GENERATOR

This application is a U.S. National Phase application of PCT International Application No. PCT/EP2019/081664, filed Nov. 18, 2019, which is incorporated by reference herein.

The present invention refers to a laundry treating appliance, for example a laundry washing machine (called also washing machine), a laundry washer-drier (called also washer-drier), a tumble drier, having a vapor and/or mist and/or aerosol generator.

BACKGROUND

Traditional laundry treating appliances, for example washing machines, washer-driers, tumble driers, typically comprise a cabinet or housing in which a drum is rotatably mounted.

The drum typically comprises a tubular mantle, housed inside the cabinet and rotatable with respect to a rotation axis; in the so called "horizontal axis" laundry treating appliances, the rotation axis can be horizontal or slightly inclined with respect to a horizontal surface (e.g. the floor of a room) on which the laundry treating appliance is configured to lay.

In the so called "vertical axis" laundry treating appliances, the rotation axis is substantially vertical with respect to a horizontal surface on which the laundry treating appliance is configured to lay.

The tubular mantle delimits an inner volume in which the laundry to be treated (for example washed and/or dried) by the laundry treating appliance can be loaded.

A first end of the tubular mantle is closed, at least partially, by flange.

Such a flange is typically perforated for allowing liquid (in washing machines and washer-driers) or air (in tumble dryers and washer-driers) to enter/exit the inner volume delimited by the tubular mantle.

In known washing machines, washer-driers, and in some tumble driers, the flange is fixed to the tubular mantle, for example by welding or clinching, so that the flange rotates with the tubular mantle.

In some known tumble driers the flange is static with respect to the cabinet, and only the tubular mantle rotates; in this case, typically, the first end of the tubular mantle is coupled to the flange by a sealing element, which can be, for example, a ring made of felt, fixed or mounted to the flange, on which the edge of the tubular mantle slides during the rotation of the latter, so as to establish an airtight rotating connection between the tubular mantle and the flange.

In the so called "horizontal-axis" "top loading" laundry treating appliances (in which the rotating axis of the tubular mantle is horizontal or slightly inclined, and the laundry can be loaded in the inner volume of the tubular mantle from a top wall of the cabinet or housing), also the second end of the tubular mantle is at least partially closed by a flange (fixed to the tubular mantle, so that it can rotate with the latter), and the laundry can be loaded in the inner volume by an opening, closable by a suitable porthole, present in the wall of the tubular mantle.

In the "front loading" laundry treating appliances (in which the rotating axis of the tubular mantle is horizontal or slightly inclined, and the laundry can be loaded in the inner volume of the tubular mantle from a loading/unloading opening provided at front wall of the cabinet or housing), and in the "vertical axis" laundry treating appliances (in which the rotating axis of the tubular mantle is vertical, and the laundry can be loaded in the inner volume of the tubular mantle from a loading/unloading opening provided at the top wall of the cabinet or housing), also the second end of the tubular mantle is opened for allowing loading/unloading the laundry; in this case, typically, the second end, opened, of the tubular mantle can be closed, together with the loading/unloading opening of the cabinet or housing, by a door or porthole associated to the latter.

In known washing machine or washer-driers, the cabinet also houses a washing tub, typically suspended to the cabinet through springs and dampers, in which the drum is rotatably contained.

In known tumble driers, the tub is not provided, and the drum is typically rotatably supported in the cabinet, generally by rollers pivoted to a supporting structure static with respect to the cabinet.

Some known laundry treating appliances also comprise steam generators, i.e. water vapor generators, allowing to release steam within the inner volume of the tubular mantle. The steam is released into the inner volume of the tubular mantle so as to contact the laundry contained therein and exert on the latter one or more advantageous actions (for example a disinfecting actions and/or an anti-crease actions, etc.).

In order to produce the steam, some known laundry treating appliances comprise a boiler, housed within the cabinet externally to the inner volume of the tubular mantle, in which water can be loaded and heated, typically by an electric heater present in the boiler, for producing steam that is then driven towards and released into the inner volume of the tubular mantle.

In some known solutions, in particular in washing machines or washer driers, in which the wall of the mantle, and optionally the flange, are typically perforated, the steam is released within the tub, outside the tubular mantle, and it enters the inner volume of the tubular mantle via the perforated wall of the latter and/or the perforated flange.

In some known washing machines or washer-driers, the boiler can be defined by or coincide with a bottom region of the tub in which an electric heater is positioned; in this case the electric heater has the double function of heating the washing liquid during the washing phases, and of heating water for producing steam in the steam supplying phases.

In other known solutions, in particular in tumble driers, the steam produced in the boiler is driven by piping to a region external but close to the inner volume of the tubular mantle, and it is released within the latter by a suitable nozzle configured for releasing steam directly within the inner volume, or in a region external but in fluid communication with the latter from which the steam can enter the inner volume.

In some known tumble driers, in particular of the front-loading type, the nozzle for releasing the steam can be fixed to a static part of the tumble drier, and it faces the open end of the tubular mantle from which laundry can be loaded into the inner volume of the latter; in this case the steam enters the inner volume through such an open end.

In other known tumble driers, the steam generated in the boiler is driven towards and released within a perforated conical protrusion protruding from the flange connected to the first end of the tubular mantle towards the inner volume of the latter; in this case the steam enters the inner volume through the perforated conical protrusion.

There are also some known solutions, in particular tumble driers of the front-loading type, in which a steam generator comprising a water reservoir is mounted on the door or porthole of the machine, and it is arranged in such a way to release the steam towards the open end of the tubular mantle from which laundry can be loaded into the inner volume of the latter.

These known solutions have however some drawbacks.

First of all, in known solutions there is the risk that the steam does not effectively reach all the laundry contained in the inner volume of the tubular mantle.

For example, in the known solutions in which the steam enters the inner volume of the tubular mantle through the perforated wall of the latter and/or of the flange, such walls, even if perforated, obstruct the path of the steam towards the laundry contained in the volume, and there is therefore the risk that some laundry, in particular the part of the laundry positioned in the central part of the inner volume, is not effectively contacted by the steam.

In addition, in the known solutions in which the steam enters the inner volume of the tubular mantle from the open end of the latter, the laundry positioned close to such open end obstructs the path of the steam towards the part of the laundry positioned in the central and in the rear part of inner volume.

In addition, in the known solutions, since the steam is produced in a boiler or steam generator which is positioned relatively far away from the laundry, there is the risk that such a steam cools down too much before reaching the laundry, losing its effect and/or condensing, with the risk of not being able to exert the intended action on the laundry and/or of wetting the latter.

A further drawback of above cited known solutions is that, since the steam is produced in a boiler/steam generator which is positioned relatively far away from the laundry, some of the steam, before reaching the laundry, can contact other parts of the laundry treating appliance, typically cooler than the steam, by which it can be cooled down and condensed; the amount of steam produced by the boiler/steam generator, and therefore the related water and energy consumption, must be therefore relatively high, so that a sufficient amount of steam can reach the laundry even if part of it condenses on such cooler parts.

In addition, the boiler/steam generator and the circuit for taking the steam into the inner volume of the tubular mantle are quite complex and bulky, and they occupy, within the cabinet, a relative high volume, which could otherwise be used for increasing the load capacity of the machine.

In addition, the known solutions in which the steam generator is mounted on the door or porthole of the machine have some further problems. First, the steam generator reaches high temperatures, and therefore the door must be properly thermally insulated in order to avoid possible injuries to the users; this increases the costs and the complexity of such known solutions.

In addition, in order to provide the electric power to the steam generator mounted on the door, electric power must be delivered from the cabinet to the door, which must be therefore properly electrically insulated in order to avoid possible injuries to the users; this increases even more the costs and the complexity of such known solutions.

In addition, in the solutions in which the steam generator is mounted on the door or porthole, the latter is quite heavy, and therefore cumbersome to handle, in particular when the water reservoir of the steam generator is full of water.

SUMMARY

The aim of the present invention is therefore to provide a laundry treating appliance that does not present above mentioned problems, and which allows treating all or at least most of the laundry contained in the inner volume of the tubular mantle with vapor and/or mist and/or aerosol in an improved and more effective way compared to the known art, reducing, at the same time, the water and energy consumption with respect to the prior art.

Within this aim, a further object of the invention is obtaining a laundry treating appliance in which, with respect to above cited prior art solutions, the space within the cabinet can be organized in a more rational and effective way.

A further object of the present invention, is obtaining a laundry treating appliance in which a system for producing vapor and/or mist and/or aerosol does not require a specific design or a specific thermal and/or electric insulation of the door or porthole of the laundry treating appliance.

Another object of the present invention is obtaining a laundry treating appliance which is reliable and which is few subjected to wear and tear.

Applicant has found that, by providing a laundry treating appliance in which an electric liquid treating device fixed to the tubular mantle or to the flange is configured for treating a liquid contained in a liquid reservoir fixed to the tubular mantle or to the flange, in such a way to release vapor and/or mist and/or aerosol within the tubular mantle, it is possible producing such a vapor and/or mist and/or aerosol very close to the inner volume of the tubular mantle, reducing the risk that part of such vapor and/or mist and/or aerosol could condense or could become less effective before reaching the laundry.

Producing the vapor and/or mist and/or aerosol directly on the tubular mantle and/or flange, and therefore very close, or also, in some advantageous embodiments, directly within the inner volume of the tubular mantle, increases the probability that all the laundry is effectively contacted by such a vapor and/or mist and/or aerosol, and in addition it allows using less liquid and energy for producing the vapor and/or mist and/or aerosol with respect to the prior art solutions, in which part of the liquid and energy are used for taking the steam from a relatively distant part of the laundry treating appliance to the laundry.

It is highlighted that vapor is defined as the gaseous state of a substance as distinguished from the liquid or solid state of the same substance; therefore, steam is a kind of vapor, in which the substance is water. Mist is defined as a suspension of fine drops of a liquid in a gas. Aerosol is defined as a gaseous suspension of fine solid or liquid particles. Therefore, mist is a kind of aerosol, in which the suspended particles are liquid drops.

In particular, above aim is solved by a laundry treating appliance comprising:
  a cabinet,
  a tubular mantle, housed inside the cabinet and rotatable with respect to a rotation axis, a first end of which is closed, at least partially, by a flange, the tubular mantle delimiting an inner volume in which laundry can be loaded,
  a liquid reservoir configured for containing a liquid,
  an electric liquid treating device configured for treating a liquid contained in the liquid reservoir so as to release, within the tubular mantle, at least one of the following:
  vapor;
  mist;
  aerosol;
  wherein the liquid reservoir is fixed to the tubular mantle or to the flange, and the electric liquid treating device is fixed to the tubular mantle or to the flange.

It is underlined that in the present application, unless otherwise specified, the word "fixed" means both "fixed directly" and "fixed with the interposition of one or more connection elements".

Advantageously, the liquid reservoir can be mounted on an outer surface or on an inner surface of the tubular mantle or on an external surface or on an internal surface of the flange.

Mounting the liquid reservoir on an inner surface of the tubular mantle or on an internal surface of the flange is advantageous since, in this way, it can be provided an appliance with additional functionalities for treating laundry without taking away further space in the volume contained within the appliance cabinet but outside the inner volume of tubular mantle.

Advantageously, the electric liquid treating device can be mounted on an outer surface or on an inner surface of the tubular mantle or on an external surface or on an internal surface of the flange.

Mounting the electric liquid treating device on an inner surface of the tubular mantle or on an internal surface of the flange is preferable, since in this way it is closer to the laundry, which increases the probability that all the laundry is contacted by the vapor and/or mist and/or aerosol, and also reduces the energy and liquid consumption for taking a certain amount of vapor and/or mist and/or aerosol within the inner volume, and in addition it leaves more free space outside the tubular mantle or flange, which can be used, for example, for better and/or more easily arranging the rest of the components of the laundry treating appliance within the housing.

Mounting the liquid reservoir on the inner surface of the tubular mantle or on the internal surface of the flange leaves more free space outside the tubular mantle or flange which can be used, for example, for better and/or more easily arranging the rest of the components of the laundry treating appliance within the housing.

It is preferable mounting the liquid reservoir on the same inner surface of the tubular mantle or internal surface of the flange where the electric liquid treating device is mounted, since it allows reducing the length and the complexity of the piping connecting the liquid reservoir to the electric liquid treating device.

It is underlined that "mounted on a surface" means fixed to this surface, directly or with the interposition of a further element, for example a spacer or a connection piece, etc.

In preferred embodiments, the electric liquid treating device comprises one or more pumps configured for drawing a liquid from the liquid reservoir and pumping it in a different region.

In an advantageous embodiment, at least one pump of the one or more pumps is configured for pumping a liquid in a nebulizing nozzle fixed to the tubular mantle or to the flange and configured for injecting mist within the tubular mantle.

Such mist has the advantageous effect, for example, of reducing the creases that could appear in the laundry during the drying of the latter.

In a further advantageous embodiment, at least one pump of the one or more pumps is configured for pumping a liquid in a liquid container fixed to the tubular mantle or to the flange.

In a further advantageous embodiment, at least one of the one or more pumps is configured for pumping a liquid in a three-way valve configured for selectively directing the liquid to a nebulizing nozzle) fixed to the tubular mantle or to the flange and configured for injecting mist within the tubular mantle, and/or directing the liquid to a liquid container fixed to the tubular mantle or to the flange.

In the advantageous embodiment in which the one or more pumps are configured for pumping a liquid in the liquid container, the electric liquid treating device can advantageously comprise an electric heating device positioned within the liquid container and configured for heating a liquid contained therein until producing vapor.

Such vapor can have high temperature and can therefore be used for disinfecting the laundry and/or the tubular mantle and/or the flange.

In the advantageous embodiment in which the one or more pumps are configured for pumping a liquid in the liquid container, the electric liquid treating device can advantageously comprise a vibrating membrane positioned within the liquid container and configured for producing mist by vibrating within a liquid contained in the liquid container.

Preferably, the vibrating membrane is configured for producing mist by vibrating at ultrasonic frequency.

In the advantageous embodiment in which the one or more pumps are configured for pumping a liquid in the liquid container, the electric liquid treating device can advantageously comprise an aerosol generating device configured for pumping air within the liquid container in such a way to generate an aerosol within the latter.

Preferably, the aerosol generating device comprises a compressor, fixed to the tubular mantle or to the flange and configured for pumping compressed air to a suitable air nozzle configured for supplying such air to a liquid contained in the liquid container in such a way to produce an aerosol.

Advantageously, and further preferably, the liquid container comprises one or more apertures and/or perforated surfaces through which vapor and/or mist and/or aerosol contained within the liquid container can exit the latter.

In a further advantageous embodiment, the laundry treating appliance comprises a conditioning device fixed to the tubular mantle or to the flange and configured for adding a conditioning substance to the liquid before the latter is turned into mist and/or vapor and/or aerosol.

This advantageous solution allows to release such conditioning substance to the laundry together with the mist and/or the vapor and/or the aerosol thereby enhancing the treatment to be carried out on laundry.

Preferably, the conditioning device comprises a conditioning substance reservoir configured for receiving a conditioning substance and crossed by a conduit in which the liquid flows before being turned into mist and/or vapor and/or aerosol, in such a way that the liquid mixes with the conditioning substance before being turned into mist and/or vapor and/or aerosol. This solution allows to mix the conditioning substance with the liquid (e.g. water) in an easy and effective way. The conditioning substance may be activated by said liquid and can be advantageously in a solid form, such as a granular form.

Preferably, the conditioning substance is or contains a fragrance.

Preferably, the liquid is or contains water.

In a further advantageous embodiment, the laundry treating appliance comprises a light generating source fixed to the tubular mantle or to the flange and configured for emitting light within the tubular mantle.

Preferably, the light generating source is an ultraviolet light generating source. The ultraviolet light has an antibacterial effect on the laundry contained in the inner volume.

In a preferred embodiment, the light generating source is configured for generating a light at more than one frequency.

Advantageously, the laundry treating appliance comprises a control unit managing one or more operations of the laundry treating appliance, and the electric liquid treating device is controlled by the control unit.

Preferably, the light generating source is controlled by the control unit.

More preferably, the control unit is configured for controlling the light generating source and the electric liquid treating device in such a way that the light generating source emits light within the tubular mantle during and/or after the release of mist and/or vapor and/or aerosol within the tubular mantle.

In the advantageous embodiment in which the light generating source is an ultraviolet light generating source, emitting ultraviolet light within the inner volume of the tubular mantle during the release of mist and/or vapor and/or aerosol within the inner volume, such light has a synergic effect with the release of mist and/or vapor and/or aerosol, which improves the disinfection of the laundry. In addition, the possibility to emit ultraviolet light within the inner volume of the tubular mantle after the release of mist and/or vapor and/or aerosol, allows to counter the growth of bacteria that could be generated, for example, in condensed liquid possibly remained in the inner volume after the supply of mist and/or vapor and/or aerosol.

In an advantageous embodiment, the control unit is configured for controlling the light generating source and the electric liquid treating device in such a way that the light generating source emits light at a frequency that depends on the operating status of the electric liquid treating device and/or of the laundry treating appliance.

The expression "operating status" is referred to the operations that can be performed by the liquid treating device or by the laundry treating appliance; for example, the liquid treating device can be in an ON status or in an OFF status, and the laundry treating appliance can be in an OFF status, or can be in stand-by, or it can be performing a specific washing and/or drying program. Stating that the frequency depends on the operating status means, for example, that a first frequency is used, for example, if the liquid treating device is ON, and a further different frequency is used, for example, if the liquid treating device is OFF; in the same way, a certain frequency can be used, for example, if the laundry treating appliance is performing a certain washing or drying program, and a further different frequency can be used, for example, if the laundry treating appliance is performing a different washing or drying program.

The possibility to modify the frequency in relation to the operating status allows to use the specific light frequency that better suits to the operating status; for example, the ultraviolet frequency can be used during the supply of vapor, so as to increase the disinfecting effect, while a visible frequency can be used during the load of the laundry, so as to better see the internal of the inner volume.

In case the door of the laundry treating appliance is transparent to the light generated by the light generating source, this advantageous embodiment allows for example to understand, from the external of the laundry treating appliance, which is the operating status of the electric liquid treating device and/or of the laundry treating appliance, simply by the color (corresponding to the frequency) of the light.

In an advantageous embodiment, the mist and/or vapor and/or aerosol is released within the tubular mantle through one or more outlets rotating together with the tubular mantle, and the laundry treating appliance comprises a sensor system configured for detecting data related to the position of at least one of the one or more outlets with respect to a horizontal surface on which the laundry treating appliance is configured to lay. In this way it is possible to know exactly the position of the outlets, so as to release the mist and/or vapor and/or aerosol when they are in the more convenient position.

Preferably, the sensor system is, or comprises, an accelerometer or gyroscope rotating together with the tubular mantle, and/or comprises an encoder configured for detecting the angular position of a prefixed reference point of the tubular mantle.

More preferably, the sensor system is in signal communication with the control unit.

Still more preferably, the control unit is configured for activating the electric liquid treating device and releasing mist and/or vapor and/or aerosol within the tubular mantle when the position of at least one of the one or more outlets corresponds to a prefixed position.

Preferably, the prefixed position is a position in which the at least one of the one or more outlets is positioned, with respect to the horizontal surface on which the laundry treating appliance lays, such as a room floor, above a plane including the rotation axis of the tubular mantle and inclined, with respect to the horizontal surface, of the same angle as the rotation axis.

Since the laundry typically rests, during its treating, below such a plane, this prefixed position increases the probability that the outlets are positioned above the laundry during the release of mist and/or vapor and/or aerosol, so that the laundry does not obstructs such outlets.

More preferably, the prefixed position is a position in which the at least one of the one or more outlets is positioned at its higher position with respect to the horizontal surface on which the laundry treating appliance lays. In this way the probability that the outlets are positioned above the laundry during the release of mist and/or vapor and/or aerosol, so that the laundry does not obstructs such outlets, is still higher.

In an advantageous embodiment, the laundry treating appliance comprises at least one lifter for moving laundry contained in the tubular mantle, the lifter having a hollow body protruding from the inner surface of the tubular mantle towards the rotation axis of the tubular mantle, wherein the liquid reservoir and/or the electric liquid treating device is partially or totally contained within the hollow body.

In this way the liquid reservoir and/or the electric liquid treating device does not reduce the space within the inner volume of the tubular mantle available for the laundry;

at the same time since the liquid reservoir and/or the electric liquid treating device are very close to the laundry, the latter is effectively contacted by the mist and/or vapor and/or aerosol, and the water and energy consumption is also reduced.

In an advantageous embodiment, at least one of the one or more pumps is partially or totally contained within the hollow body.

Preferably, all the one or more pumps are partially or totally contained within the hollow body.

Preferably, the liquid container is partially or totally contained within the hollow body, or it is defined by the hollow body or by a portion thereof. This solution further ensures that the liquid container does not reduce (or reduces it of a small amount) the space for the laundry within the inner volume of the tubular mantle, since the liquid container uses the space already used by the hollow body.

Advantageously, the hollow body comprises a perforated surface through which mist and/or vapor and/or aerosol contained in the hollow body can be released into the inner volume delimited by the tubular mantle.

In an advantageous embodiment, the light generating source is housed at least partially within the hollow body or within the hollow body of a further lifter provided within the tubular mantle, and the hollow body comprises a wall, or a portion thereof, which is transparent to the light emitted by the light generating source. This solution ensures that the light generating source does not reduce (or reduces it of a small amount) the space for the laundry within the inner volume of the tubular mantle, since the light generating source uses the space already used by the hollow body. In addition, the light generating source is very close to the inner volume, and therefore its effect on laundry can be enhanced and fully used efficiently, i.e. without dispersion.

In an advantageous embodiment, the laundry treating appliance comprises a temperature sensor configured for sensing the temperature of a liquid contained within the liquid container.

In this case, the control unit is preferably operatively connected to the temperature sensor and is configured for controlling the heating device depending on the temperature sensed by the temperature sensor.

In an advantageous embodiment, the laundry treating appliance comprises: a wireless power transmitter unit associated to a non-rotating part of the laundry treating appliance and arranged for wireless transmitting electric power to a wireless power receiver unit rotating with the tubular mantle, wherein the wireless power receiver unit is configured for supplying electric power to the electric liquid treating device. This solution is particularly effective, since it allows supplying electric power to the electric liquid treating device even if it is fixed to the tubular mantle, without the need of using, for example, sliding electric contacts, that could require some further arrangements for insulation when used, for example, within a liquid.

Advantageously, the wireless power transmitter unit and the wireless power receiver unit are configured for transmitting and/or receiving one or more electric communication signals.

Preferably, in this case, the wireless power transmitter unit is operatively connected to the control unit of the appliance, and the wireless power receiver unit are operatively connected to one or more sensors associated to the tubular mantle.

In an advantageous embodiment, the wireless power receiver unit is arranged for supplying electric power to the one or more pumps.

In an advantageous embodiment, the wireless power receiver unit is arranged for supplying electric power to the three-way valve.

In an advantageous embodiment, the wireless power receiver unit is arranged for supplying electric power to the electric heating device.

In an advantageous embodiment, the wireless power receiver unit is arranged for supplying electric power to the vibrating membrane.

In an advantageous embodiment, the wireless power receiver unit is arranged for supplying electric power to the light generating source.

Preferably, the electric liquid treating device is wired connected to the wireless power receiver unit.

Advantageously, the wireless power transmitter unit is electrically connected to an electrical system of the laundry treating appliance.

Preferably, the power transmitter unit and the power receiver unit are positioned, one opposite to the other, fixed respectively to the not-rotating part of the laundry treating appliance and to the tubular mantle or to an element rotating with the latter, parallel one another, and to a plane perpendicular to the rotation axis of the tubular mantle.

Advantageously, the wireless power transmitter unit comprises a transmission coil generating a magnetic field and the wireless power receiver unit comprises a reception coil generating power from the magnetic field generated by the transmission coil and supplying the generated power to the electric liquid treating device.

Advantageously, the transmission coil and the reception coil are aligned, centered and parallel one another, and to a plane perpendicular to the rotation axis of the tubular mantle.

Preferably, the transmission coil and the reception coil have a common radius dimension approximately equal to the tubular mantle external radius and are distanced in axial direction by a distance lower than their radius.

More preferably, the transmission coil and the reception coil are distanced in axial direction by a distance lower than 10 cm.

Still more preferably, the transmission coil and the reception coil are distanced in axial direction by a distance lower than 5 cm.

In an advantageous embodiment, the wireless power receiver unit comprises a receiver magnetic shielding member, and the wireless power transmitter unit comprises a transmission magnetic shielding member.

Preferably, the receiver magnetic shielding member is positioned between the reception coil and the tubular mantle side, and the transmission magnetic shielding member is positioned between the transmission coil and the not rotating part side.

Advantageously, the receiver magnetic shielding member is positioned on the opposite side of the reception coil with respect to the wireless power transmitter unit.

Advantageously, the transmission magnetic shielding member is positioned on the opposite side of the transmission coil with respect to the wireless power receiver unit.

In a further advantageous embodiment, the laundry treating appliance comprises a battery or battery pack fixed to the tubular mantle or to the flange and configured for supplying electric power to the electric liquid treating device.

In an advantageous embodiment, the battery or battery pack is configured for supplying electric power to the one or more pumps.

In an advantageous embodiment, the battery or battery pack is configured for supplying electric power to the three-way valve.

In an advantageous embodiment, the battery or battery pack is configured for supplying electric power to the electric heating device.

In an advantageous embodiment, the battery or battery pack is configured for supplying electric power to the vibrating membrane.

In an advantageous embodiment, the battery or battery pack is configured for supplying electric power to the light generating source.

The use of a battery or battery pack allows to supply electric power without the need of electrically connecting an electric component to electric mains present outside the laundry treating appliance thereby simplifying the laundry treating appliance wiring.

Preferably, the battery or battery pack is fixed to the tubular mantle or to the flange, and the electric liquid treating device is fixed to the same tubular mantle or flange to which the battery or battery pack is fixed. This advantageous embodiment is particularly advantageous if the electric liquid treating device is mounted on a component (e.g. the tubular mantle) rotating with respect to the housing, since in this way the problems related to transferring electric power from a static to a rotating part are not present.

Advantageously, the battery or battery pack can be provided alternatively or in addition to a system comprising the wireless power transmitter unit and the wireless power receiver unit as the one previously mentioned.

In a further advantageous embodiment, the laundry treating appliance comprises a sliding electric contact system configured for supplying electric power to the electric liquid treating device from non-rotating part of the laundry treating appliance.

In an advantageous embodiment, the sliding electric contact system is configured for supplying electric power to the one or more pumps.

In an advantageous embodiment, the sliding electric contact system is configured for supplying electric power to the three-way valve.

In an advantageous embodiment, the sliding electric contact system is configured for supplying electric power to the electric heating device.

In an advantageous embodiment, the sliding electric contact system is configured for supplying electric power to the vibrating membrane.

In an advantageous embodiment, the sliding electric contact system is configured for supplying electric power to the light generating source.

Advantageously, the sliding electric contact system can be provided alternatively or in addition to a system comprising a wireless power transmitter unit and a wireless power receiver unit as the one mentioned before and/or to a battery or battery pack as the one mentioned before.

In an advantageous embodiment, the flange is fixed to and rotates with the tubular mantle. In this configuration, that can be used in a washing machine or a washer-drier or a tumble drier, the assembly of the tubular mantle and the flange defines a rotatable drum.

In a further advantageous embodiment, the tubular mantle is rotatable with respect to the flange, and the rear end of the tubular mantle is coupled to the flange by a sealing element. This layout can be used in a tumble drier.

Above aim is solved also by a method for operating a laundry treating appliance as one or more of the ones mentioned before, which comprises:
- loading a liquid within the liquid reservoir fixed to the tubular mantle or to the flange;
- loading laundry within the tubular mantle;
- activating the electric liquid treating device fixed to the tubular mantle or to the flange for treating the liquid in such a way to generate mist and/or vapor and/or aerosol,
- releasing the mist and/or vapor and/or aerosol within the tubular mantle, so that this mist and/or vapor and/or aerosol goes against the laundry loaded within the tubular mantle.

Advantageously, if the laundry treating appliance comprises one or more of the pumps mentioned above, the method comprises:
- activating one or more pumps for drawing the liquid contained in the liquid reservoir and pumping it in a different region.

Advantageously, if the liquid reservoir is mounted on an inner surface of the tubular mantle or on an internal surface of the flange, and therefore it is housed within the inner volume of the tubular mantle where the laundry can be loaded, the user accesses the internal of the tubular mantle for loading the liquid within the liquid reservoir.

Advantageously, if the electric liquid treating device is mounted on an inner surface of the tubular mantle or on an internal surface of the flange, and therefore it is housed within the inner volume of the tubular mantle where the laundry can be loaded, the generation of mist and/or vapor and/or aerosol takes place directly within the inner volume of the tubular mantle, and therefore very close to the laundry on which the mist and/or vapor and/or aerosol has to be released.

Advantageously, if the laundry treating appliance comprises one or more of the pumps mentioned above, one of which is configured for pumping a liquid in a nebulizing nozzle, as mentioned above, the method comprises:
- activating the at least one of the one or more pumps for drawing the liquid from the liquid reservoir and pumping it in the nebulizing nozzle so as to inject mist within the tubular mantle.

Advantageously, if the laundry treating appliance comprises one or more of the pumps mentioned above, one of which is configured for pumping a liquid in a liquid container, as mentioned above, the method comprises:
- activating the at least one of the one or more pumps for drawing the liquid from the liquid reservoir and pumping it in the liquid container.

Advantageously, if the laundry treating appliance comprises one or more of the pumps mentioned above, one of which is configured for pumping a liquid in a three-way valve, as mentioned above, method comprises:
- activating the at least one of the one or more pumps for drawing the liquid from the liquid reservoir and pumping it in the three-way valve;
- operating the three-way valve for selectively directing the liquid to the nebulizing nozzle and/or to the liquid container.

Advantageously, if the laundry treating appliance comprises one or more of the pumps mentioned above, one of which is configured for pumping a liquid in a nebulizing nozzle as mentioned above, and one of which is configured for pumping a liquid in a liquid container as mentioned above, the method comprises:
- activating one or both the pump configured for pumping a liquid in the nebulizing nozzle and the pump configured for pumping a liquid in the liquid container and selectively pumping the liquid in the nebulizing nozzle and/or in the liquid container.

Advantageously, if the laundry treating appliance comprises one or more of the pumps mentioned above, one of which is configured for pumping a liquid in container containing an electric heating device as mentioned above, the method comprises:
- activating the electric heating device for heating a liquid contained in the liquid container until producing vapor;
- supplying the vapor within the tubular mantle.

Advantageously, if the laundry treating appliance comprises one or more of the pumps mentioned above, one of which is configured for pumping a liquid in container containing a vibrating membrane as mentioned above, the method comprises:
- activating the vibrating membrane for vibrating within the liquid contained in the liquid container and producing mist;
- supplying this mist within the tubular mantle.

Advantageously, if the laundry treating appliance comprises one or more of the pumps mentioned above, one of which is configured for pumping a liquid in container, and an aerosol generating device, as mentioned above, the method comprises:

activating the aerosol generating device for pumping air within the liquid container in such a way to generate an aerosol within the latter;

supplying the aerosol within the tubular mantle.

Advantageously, if the laundry treating appliance comprises a conditioning device, as mentioned above, the method comprises:

adding, by the conditioning device, a conditioning substance to the liquid before the latter is turned into mist and/or vapor and/or aerosol.

In this case, the method could advantageously comprise:

loading a conditioning substance in the conditioning substance reservoir;

taking this liquid in the conduit in such a way that it crosses and mixes with the conditioning substance;

turning the mix of liquid and conditioning substance into mist and/or vapor and/or aerosol, supplying this mist and/or vapor and/or aerosol, within the tubular mantle.

Preferably, the conditioning substance is or contains a fragrance.

Preferably, the liquid is or contains water.

Advantageously, if the laundry treating appliance comprises a light generating source, as mentioned above, the method comprises:

activating the light generating source for emitting light within the tubular mantle during and/or after the release of mist and/or vapor and/or aerosol within the tubular mantle.

Preferably, the method comprises:

activating the light generating source for emitting ultraviolet light within the tubular mantle during and/or after the release of mist and/or vapor and/or aerosol (111) within the tubular mantle.

In an advantageous embodiment, the method comprises:

activating the light generating source for emitting within the tubular mantle light at a frequency that depends on the operating status of the electric liquid treating device and/or of the laundry treating appliance.

Preferably, the method comprises:

detecting a data related to the position of at least one of the one or more outlets;

activating the electric liquid treating device and releasing mist and/or vapor and/or aerosol within the tubular mantle when the position of the outlet corresponds to a prefixed angular position.

Preferably, the prefixed position is a position in which the at least one of the one or more outlets is positioned, with respect to the horizontal surface on which the laundry treating appliance is configured to lay, above a plane including the rotation axis of the tubular mantle and inclined, with respect to the horizontal surface, of the same angle as the rotation axis of the tubular mantle.

More preferably, the prefixed position is a position in which the at least one of the one or more outlets is positioned at its higher position with respect to the horizontal surface on which the laundry treating appliance lays.

In a further advantageous embodiment, the method comprises:

- sensing the temperature of a liquid contained within the liquid container;
- controlling the heating device depending to the temperature sensed by the temperature sensor.

In a further advantageous embodiment, the phase of loading a liquid within the liquid reservoir comprises:

- loading the liquid partially or totally within the hollow body.

Advantageously, if the laundry treating appliance comprises a at least one lifter, as mentioned above, the phase of loading a liquid within the liquid reservoir comprises loading the liquid within the hollow body.

Advantageously, if the laundry treating appliance comprises a at least one lifter, as mentioned above, activating the electric liquid treating device for treating the liquid in such a way to generate mist and/or vapor and/or aerosol, comprises activating the electric liquid treating device within the hollow body.

Advantageously, if the laundry treating appliance comprises a wireless power transmitter unit and a wireless power receiver unit, as mentioned above, the method comprises:

- wireless supplying electric power from the wireless power transmitter unit to the wireless power receiver unit;
- supplying electric power from the wireless power receiver unit to the electric liquid treating device, so as to activate the latter.

Advantageously, if the laundry treating appliance comprises a wireless power transmitter unit and a wireless power receiver unit, as mentioned above, configured for supplying electric power to one or more pumps, as mentioned above, the method comprises:

- wireless supplying electric power from the wireless power transmitter unit to the wireless power receiver unit;
- supplying electric power from the wireless power receiver unit to one or more pumps, so as to activate the latter.

Advantageously, if the laundry treating appliance comprises a wireless power transmitter unit and a wireless power receiver unit, as mentioned above, configured for supplying electric power to a three-way valve, as mentioned above, the method comprises:

- wireless supplying electric power from the wireless power transmitter unit to the wireless power receiver unit;
- supplying electric power from the wireless power receiver unit to the three-way valve, so as to activate the latter.

Advantageously, if the laundry treating appliance comprises a wireless power transmitter unit and a wireless power receiver unit, as mentioned above, configured for supplying electric power to an electric heating device, as mentioned above, the method comprises:

- wireless supplying electric power from the wireless power transmitter unit to the wireless power receiver unit;
- supplying electric power from the wireless power receiver unit to the electric heating device, so as to activate the latter.

Advantageously, if the laundry treating appliance comprises a wireless power transmitter unit and a wireless power receiver unit, as mentioned above, configured for supplying electric power to a vibrating membrane, as mentioned above, the method comprises:

- wireless supplying electric power from the wireless power transmitter unit to the wireless power receiver unit;
- supplying electric power from the wireless power receiver unit to the vibrating membrane, so as to activate the latter.

Advantageously, if the laundry treating appliance comprises a wireless power transmitter unit and a wireless power receiver unit, as mentioned above, configured for supplying electric power to a light generating source, as mentioned above, the method comprises:

wireless supplying electric power from the wireless power transmitter unit to the wireless power receiver unit;

supplying electric power from the wireless power receiver unit to the light generating source, so as to activate the latter.

Advantageously, if the laundry treating appliance comprises a battery or battery pack, as mentioned above, the method comprises:

supplying electric power from the battery or battery pack to the electric liquid treating device, so as to activate the latter.

Advantageously, if the laundry treating appliance comprises a battery or battery pack, as mentioned above, configured for supplying electric power to one or more pumps, as mentioned above, the method comprises:

supplying electric power from the battery or battery pack to one or more pumps, so as to activate the latter.

Advantageously, if the laundry treating appliance comprises a battery or battery pack, as mentioned above, configured for supplying electric power to a three-way valve, as mentioned above, the method comprises:

supplying electric power from the battery or battery pack to the three-way valve, so as to activate the latter.

Advantageously, if the laundry treating appliance comprises a battery or battery pack, as mentioned above, configured for supplying electric power to an electric heating device, as mentioned above, the method comprises:

supplying electric power from the battery or battery pack to the electric heating device, so as to activate the latter.

Advantageously, if the laundry treating appliance comprises a battery or battery pack, as mentioned above, configured for supplying electric power to a vibrating membrane, as mentioned above, the method comprises:

supplying electric power from the battery or battery pack to the vibrating membrane, so as to activate the latter.

Advantageously, if the laundry treating appliance comprises a battery or battery pack, as mentioned above, configured for supplying electric power to a light generating source, as mentioned above, the method comprises:

supplying electric power from the battery or battery pack to the light generating source, so as to activate the latter.

Advantageously, if the laundry treating appliance comprises a sliding electric contact system, as mentioned above, the method comprises:

supplying electric power by the sliding electric contact system to the electric liquid treating device, so as to activate the latter.

Advantageously, if the laundry treating appliance comprises a sliding electric contact system, as mentioned above, configured for supplying electric power to one or more pumps, as mentioned above, the method comprises:

supplying electric power by the sliding electric contact system to one or more pumps, so as to activate the latter.

Advantageously, if the laundry treating appliance comprises a sliding electric contact system, as mentioned above, configured for supplying electric power to a three-way valve, as mentioned above, the method comprises:

supplying electric power by the sliding electric contact system to the three-way valve, so as to activate the latter.

Advantageously, if the laundry treating appliance comprises a sliding electric contact system, as mentioned above, configured for supplying electric power to an electric heating device, as mentioned above, the method comprises:

supplying electric power by the sliding electric contact system to the electric heating device, so as to activate the latter.

Advantageously, if the laundry treating appliance comprises a sliding electric contact system, as mentioned above, configured for supplying electric power to a vibrating membrane, as mentioned above, the method comprises:

supplying electric power by the sliding electric contact system to the vibrating membrane, so as to activate the latter.

Advantageously, if the laundry treating appliance comprises a sliding electric contact system, as mentioned above, configured for supplying electric power to a light generating source, as mentioned above, the method comprises:

supplying electric power by the sliding electric contact system to the light generating source, so as to activate the latter.

BRIEF DESCRIPTION OF THE DRAWINGS

Other advantages and features of a laundry washing machine according to the present invention will be clear from the following detailed description, provided only as a not limitative example, in which:

FIG. 1 is a sectional view of a possible advantageous embodiment of a laundry treating appliance, in particular a tumble drier, according to the invention;

FIG. 2 is a sectional view of a further advantageous embodiment of a laundry treating appliance, in particular a washing machine, according to the invention;

FIG. 18 is a sectional view of a further advantageous embodiment of a laundry treating appliance, in particular a tumble direr, according to the invention;

FIG. 19 is a sectional view of a further advantageous embodiment of a laundry treating appliance, in particular a tumble direr, according to the invention;

In the figures same parts are indicated with the same reference numbers.

DETAILED DESCRIPTION OF EXEMPLARY EMBODIMENTS

Advantageously, the laundry treating appliances illustrated in attached figures are of the front-loading type; it is however clear that the invention can be applied, without any substantial modification, also to top-loading washing machines, both of the "horizontal axis" and of the "vertical axis" type.

Figure 17:
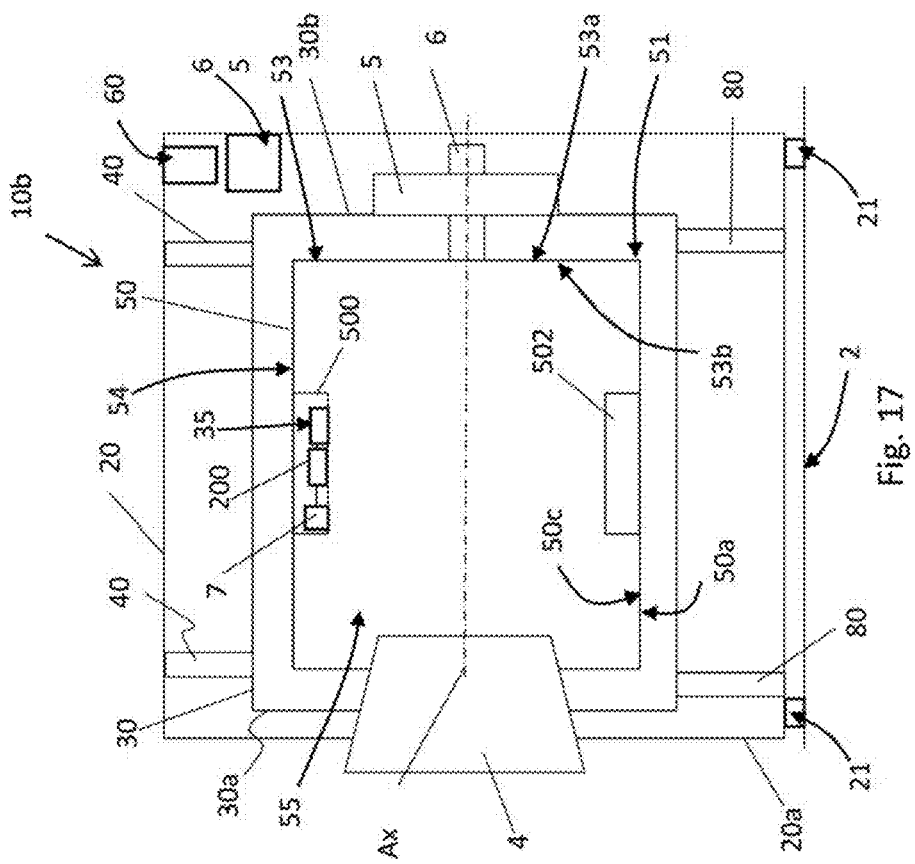
FIG. 17 is a sectional view of a further advantageous embodiment of a laundry treating appliance, in particular a washing machine, according to the invention.

In particular, the laundry treating appliances according to the invention illustrated in FIGS. 1, 16, 18 and 19 are tumble driers, indicated with reference number 10*a*, while the laundry treating appliances according to the invention illustrated in FIGS. 2 and 17 are washing machines, indicated with reference number 10*b*.

It is highlighted that the washing machines 10*b* illustrated in FIGS. 2 and 17 are "simple" washing machines (i.e. washing machines which can only wash and rinse the laundry); anyway, it is clear that the invention can be applied, without any substantial modification, also to washer-driers.

The laundry treating appliance (being it a tumble drier 10*a* or a washing machine 10*b*, or washer-drier) comprises a cabinet 20, or housing, preferably parallelepiped, configured to be positioned on a horizontal surface 2, for example the floor of a building, preferably by suitable feet 21, one or more of which ca have, advantageously, an adjustable height, so as to adapt to a possible not perfect planarity of the horizontal surface 2.

Advantageously, in the frontal wall 20*a* of the cabinet 20 an access opening, not illustrated, is preferably obtained, advantageously selectively closable by a loading/unloading door 4, preferably hinged to the frontal wall 20*a*.

The laundry treating appliance (being it a tumble drier 10*a* or a washing machine 10*b*, or washer-drier) comprises a tubular mantle 50, housed inside the cabinet 20 and rotatable with respect to a rotation axis Ax; the tubular mantle 50 delimits an inner volume 55 in which laundry can be loaded.

In the advantageous examples illustrated in attached figures, the rotation axis Ax is advantageously horizontal, or slightly inclined.

Preferably, the tubular mantle 50 is cylindrical or prismatic.

A first end 51 of the tubular mantle 50 is closed, at least partially, by a flange 53.

If the laundry treating appliance is a tumble drier, the flange 53 is preferably perforated, so that air can enter the inner volume 55 of the tubular mantle 50 through the flange 53.

If the laundry treating appliance is a washing machine or a washer-drier, the flange 53 can be preferably perforated, so that water (and also air in the case of a washer-drier) can enter the inner volume 55 of the tubular mantle 50 through the flange 53.

In advantageous embodiments, like for example the ones illustrated in FIGS. 1, 2, 16, 17 and 19, the flange 53 is fixed to (e.g. by welding or clinching) and rotates with the tubular mantle 50; in this case, the assembly of the tubular mantle 50 and the flange 53 defines a rotating drum 54, in which the laundry can be loaded. This layout is preferably used if the laundry treating appliance is washing machine or a washer-drier, but it can also be used if the laundry treating appliance is a tumble drier.

In further advantageous embodiment, for example the one illustrated in FIG. 18, the tubular mantle 50 is rotatable with respect to the flange 53, which is advantageously fixed with respect to the cabinet 20; in this case, the first end 51 of the tubular mantle 50 can be advantageously coupled to the flange 53 by a sealing element 56, which can be, for example, a ring made of felt, fixed to the flange, on which the edge of the rear end 51 of the tubular mantle 50 slides during the rotation of the latter, so as to establish an airtight rotating connection between the tubular mantle 50 and the flange 53. This layout can be advantageously used, for example, if the laundry treating appliance is a tumble drier 10*a*.

If the laundry treating appliance is a washing machine 10*b* (as, for example, in the embodiments of FIGS. 2 and 17) or a washer-drier, not illustrated, the cabinet 20 also houses a washing tub 30, preferably suspended to the cabinet 20 through springs 40 and dumpers 80, in which a drum 54, comprising the tubular mantle 50 and the flange 53 fixed to the latter, is rotatably contained. In this case, the drum 54 is preferably provided with a rotating shaft 6, protruding from the external surface 53*a* of the flange 53, and preferably supported by one or more bearings, not illustrated, provided preferably in the rear wall 30*b* of the tub 30; the shaft 6, and therefore the drum 50, is preferably rotated by an electric motor 5, preferably, but not necessarily, fixed directly to the rear wall 30*b* of the tub 30, or connected to the shaft 6 by a belt-pulley assembly, not illustrated.

If the laundry treating appliance is a washing machine 10*b* (as for example in FIGS. 2 and 17) or a washer-drier, not illustrated, it preferably comprises a water inlet circuit, not illustrated, adapted to feed water into the tub 30; the water inlet circuit can advantageously comprise a water pipe, a first end of which is preferably connected or connectable to the water mains of a building (also not illustrated), and a second end of which is preferably arranged in such a way to take water coming from its first end to internal of the washing tub 30.

Preferably, the water inlet circuit comprises an electro-valve, not illustrated, configured for selectively allowing or preventing the passage of water from the first end to the second end of the water pipe.

If the laundry treating appliance is a washing machine 10*b* (as for example in FIGS. 2 and 17) or a washer-drier, not illustrated, it is also advantageously provided with a drain circuit, also not illustrated, adapted for draining washing/rinsing liquid from the machine. The drain circuit of a washing machine/washer-drier is well known in the art, and therefore will not be described in detail.

If the laundry treating appliance is a tumble drier 10*a* (as for example in FIGS. 1, 16, 18 and 19), the tub is not provided, and the tubular mantle 50 is supported within the cabinet 20, preferably by rollers 81 pivoted to a supporting structure 82, static with respect to the cabinet 20; in this case the tubular mantle 50 is advantageously rotated by an electric motor, not illustrated, preferably connected to the tubular mantle 50 by a belt assembly, also not illustrated.

If the laundry treating appliance is a tumble drier 10*a*, it advantageously comprises an air circuit (comprising for example pipes, tubes, a fan, etc., not illustrated) by which air (depicted schematically in FIGS. 1, 16, 18 and 19 as arrows 85) is heated and is moved (preferably, but not necessarily, in a closed loop) through the tubular mantle 50, so as to dry the laundry contained therein.

If the laundry treating appliance is a tumble drier 10*a* (as for example in FIGS. 1, 16, 18 and 19), it also advantageously comprises an air heating device 83 adapted to heat air 85 circulating in the air circuit before it enters the inner volume 55 of the tubular mantle 50; preferably, the heating device comprises a heat pump system (depicted schematically in FIGS. 1, 16, 18 and 19 as a rectangle), which is advantageously adapted both to heat air 85 before it enters the inner volume 55 of the tubular mantle 50, and to remove humidity from the air 85 exiting the inner volume 55.

If the laundry treating appliance is a tumble drier 10*a* (as for example in FIGS. 1, 16, 18 and 19), it also advantageously comprises a lint filter 86, arranged in the air circuit for trapping lint or fluff released from the laundry contained in the inner volume 55, before it reaches the air heating device 83.

Advantageously, as in the examples illustrated in attached Figures, the laundry treating appliance, being it a tumble drier 10*a*, or a washing machine 10*b*, or a washer-drier, comprises at least one (preferably two or more) lifter 500 (called also elevator, or rib, or diverter), adapted to improve the stirring of the laundry during the rotation of the tubular mantle 50.

Advantageously, the lifter 500 comprises a hollow body 555 protruding from an inner surface 50*c* of the tubular mantle 50 towards the rotation axis Ax of the tubular mantle 50; the hollow body 555 is, preferably, a substantially prismatic element, advantageously positioned with its longitudinal axis substantially parallel to the rotation axis Ax of the tubular body 50.

Advantageously, the laundry treating appliance, being it a tumble drier 10*a*, or a washing machine 10*b*, or a washer-drier, comprises a control unit, depicted schematically in FIGS. 1, 2, and 16 to 19 as a rectangle 60, configured for managing the operations of the laundry treating appliance, for example by controlling the rotation speed of the motor for rotating the tubular mantle 50, as well as the other electric devices comprised in the laundry treating appliance, for example, if provided, a user interface (not illustrated), electro-valves, fans, pumps, etc.

According to the invention, the laundry treating appliance, being it a tumble drier 10*a* or a washing machine 10*b* or a washer-drier, comprises a liquid reservoir 7, fixed to the tubular mantle 50 or to the flange 53, configured for containing a liquid 3, which can be, for example, water, or water mixed with an additive, or a fragrance.

The liquid reservoir 7 can advantageously be refillable, for example manually or automatically, for example by adding bulk liquid 3, or a liquid 3 contained, for example, in a cartridge, not illustrated.

In a further advantageous embodiment, not illustrated, the liquid reservoir 7 can be advantageously configured for being totally replaced, when empty, by a further liquid reservoir 7 full of liquid 3, or it can be removed and refilled outside appliance, and then mounted again.

According to the invention, the laundry treating appliance comprises an electric liquid treating device 200, which will be better described in the following, fixed to the tubular mantle 50 or to the flange 53, and configured for treating a liquid 3 contained in the liquid reservoir 7 so as to release, within the tubular mantle 50, at least one between vapor 12, mist 11, aerosol 111.

Advantageously, the electric liquid treating device 200 is controlled by the control unit 60.

The liquid reservoir 7 can be advantageously mounted on the outer surface 50*a* or on the inner surface 50*c* of the tubular mantle 50, or on the external surface 53*a* or on the internal surface 53*b* of the flange 53.

The electric liquid treating device 200 can be advantageously mounted on the outer surface 50*a* or on the inner surface 50*c* of the tubular mantle 50, or on the external surface 53*a* or on the internal surface 53*b* of the flange 53.

It is underlined that "mounted on a surface" means fixed to this surface, directly or with the interposition of a further element, not illustrated, for example a spacer or a connection piece, etc.

In preferred embodiments, like the ones illustrated for example in attached figures, both the liquid reservoir 7 and the electric liquid treating device 200 are mounted on the tubular mantle 50 (e.g. embodiments of FIGS. 1 to 18), or both the liquid reservoir 7 and the electric liquid treating device 200 are mounted on the flange 53 (e.g. embodiment of FIG. 19).

Preferably, as in the examples of FIGS. 1 to 18, both the liquid reservoir 7 and the electric liquid treating device 200 are mounted to the inner surface 50*c* of the tubular mantle 50.

In a further advantageous embodiment, as in the example of FIG. 19, both the liquid reservoir 7 and the electric liquid treating device 200 are mounted on the internal surface 53*b* of the flange 53.

In further advantageous embodiments, not illustrated, the liquid reservoir 7 and the electric liquid treating device 200 can be mounted both on the outer surface 50*a* of the tubular mantle 50, or both on the external surface 53*a* of the flange 53.

In further advantageous embodiments, not illustrated, the liquid reservoir 7 can be mounted on the outer surface 50*a* of the tubular mantle 50, and the electric liquid treating device 200 can be mounted on the inner surface 50*c* of the tubular mantle 50, or vice versa.

In further advantageous embodiments, not illustrated, the liquid reservoir 7 can be mounted on the external surface 53*a* of the flange 53, and the electric liquid treating device 200 can be mounted on the internal surface 53*b* of the flange 53, or vice versa.

In a further advantageous embodiment, not illustrated, the liquid reservoir 7 can be mounted on the flange 53, and the electric liquid treating device 200 can be mounted on the tubular mantle 50, or vice versa; in this case, in the advantageous embodiment in which the tubular mantle 50 is rotatable with respect to the flange 53, and the latter is advantageously fixed with respect to the cabinet 20, the electric liquid treating device 200 can be advantageously configured in such a way to be fluidly connected to the liquid reservoir 7 only when, depending on the rotation of the tubular mantle 50, the position of the electric liquid treating device 200 and the position of the liquid reservoir 7 have a specific reciprocal relation, e.g. when such components face one another and/or they are at a prefixed reciprocal distance. This can be obtained, for example, using one or more suitable valves, not illustrated, associated to the electric liquid treating device 200 and/or to the liquid reservoir 7 and configured for putting into fluid communication the electric liquid treating device 200 and the liquid reservoir 7 only when, depending on the rotation of the tubular mantle 50, the position of the electric liquid treating device 200 and the position of the liquid reservoir have a specific reciprocal relation, e.g. when such components face one another and/or they are at a prefixed reciprocal distance.

In advantageous embodiments, like for example the ones illustrated in attached figures, the electric liquid treating device 200 comprises one or more pumps 13, 14 configured for drawing a liquid 3 from the liquid reservoir 7 and pumping it in a different region.

Figure 9:
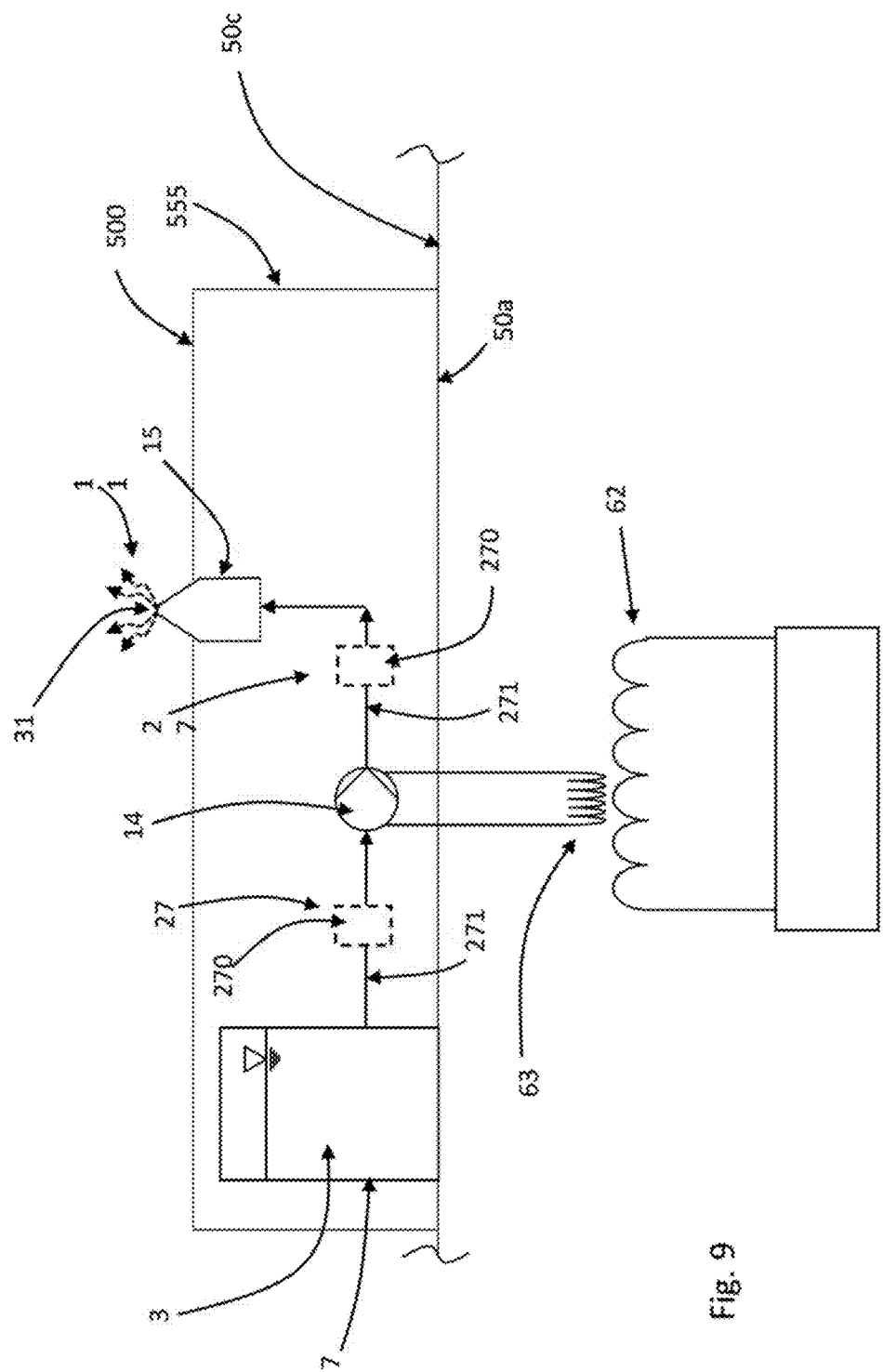
FIG. 9 is a schematic lateral view of a further advantageous embodiment of an electric liquid treating device of a laundry treating appliance according to the invention.
Figure 10:
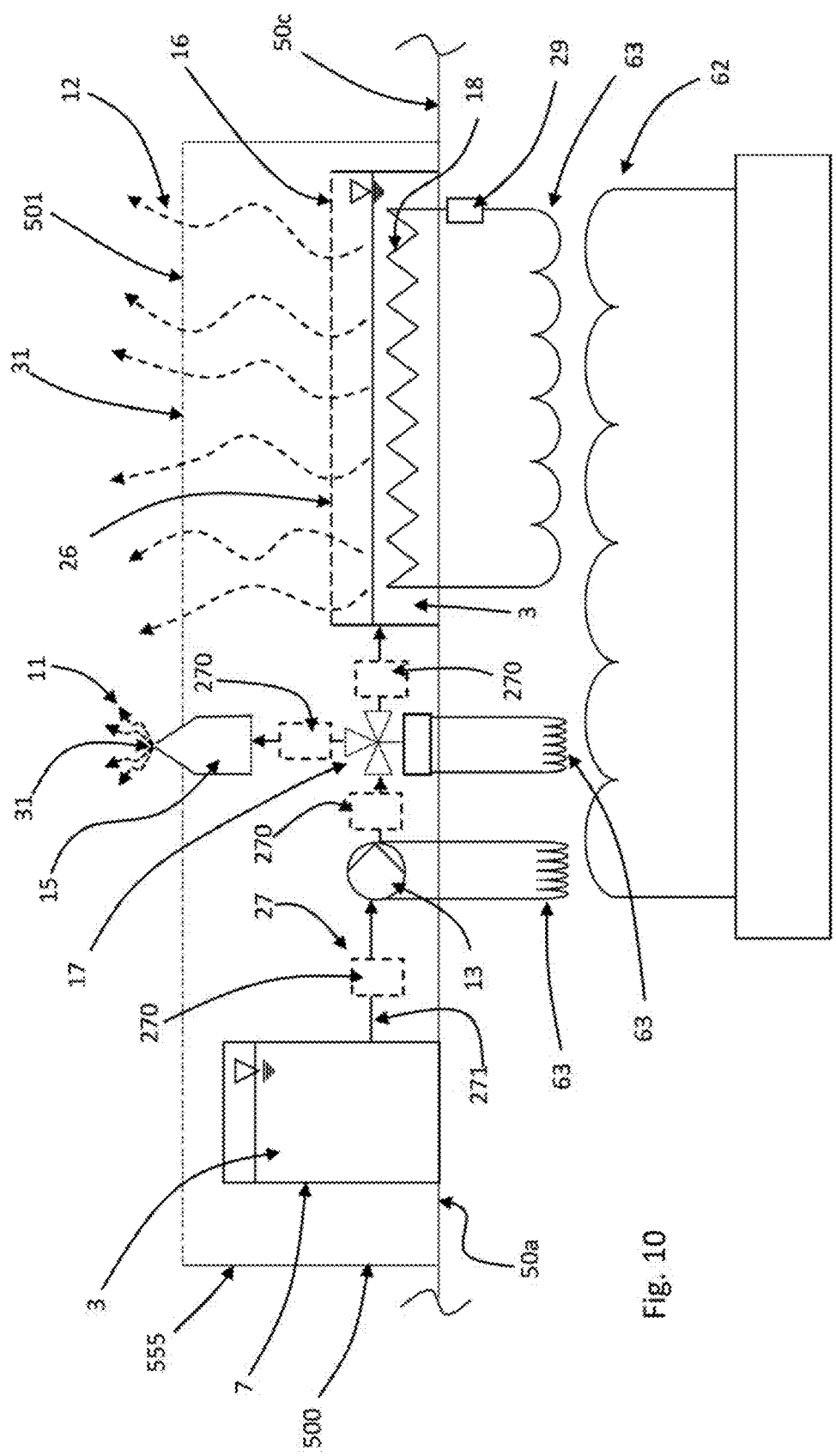
FIG. 10 is a schematic lateral view of a further advantageous embodiment of an electric liquid treating device of a laundry treating appliance according to the invention.
Figure 11:
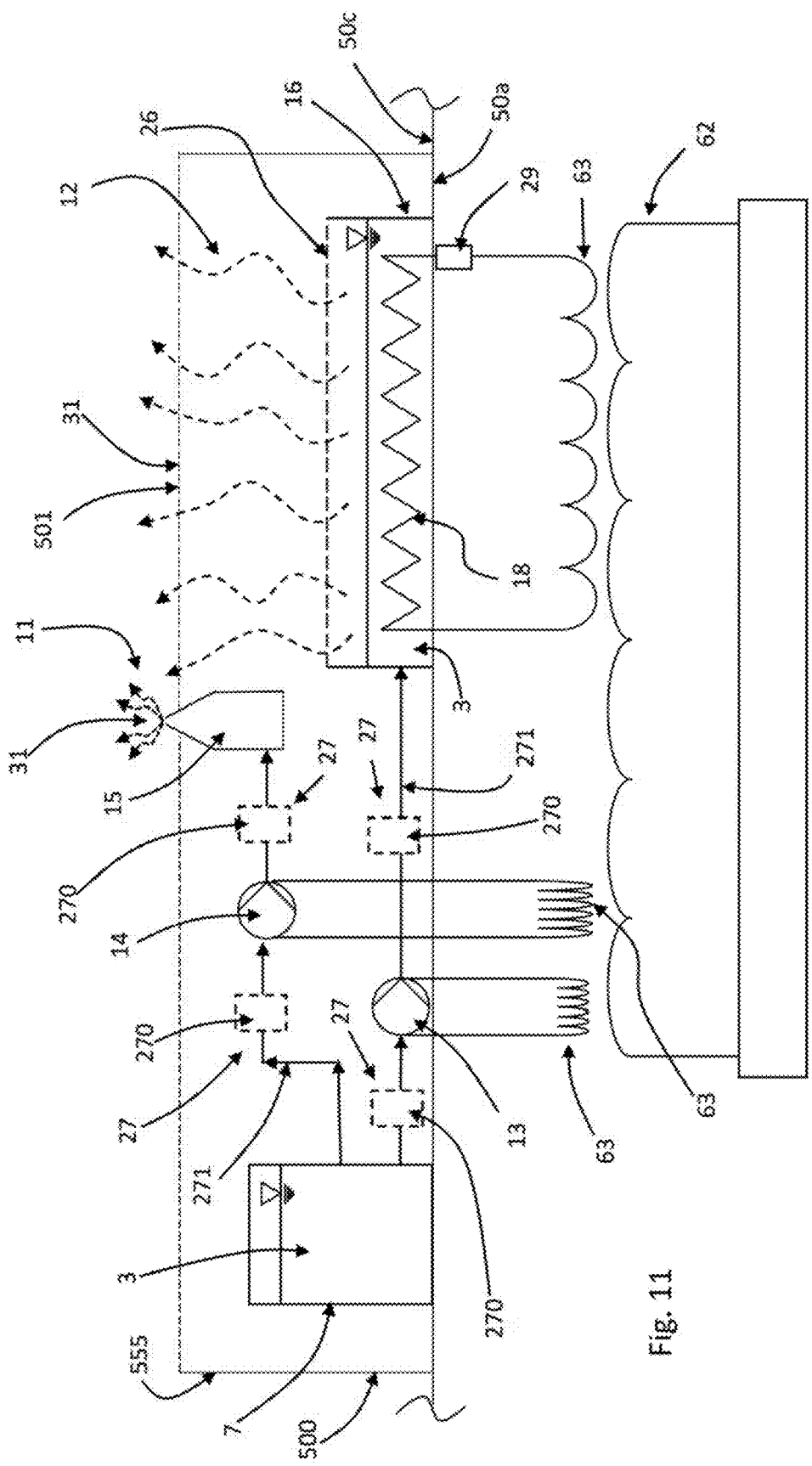
FIG. 11 is a schematic lateral view of a further advantageous embodiment of an electric liquid treating device of a laundry treating appliance according to the invention.

In advantageous embodiments, like for example the ones illustrated in FIGS. 9 to 11, at least one pump (pump 14 in FIGS. 9 and 11, and pump 13 in FIG. 10) is configured for pumping a liquid 3 in a nebulizing nozzle 15 fixed to the tubular mantle 50 (like in the examples of FIGS. 9 to 11) or to the flange 53, and configured for injecting mist 11 within the tubular mantle 50.

It is underlined that, as in the examples of FIGS. 9 to 11, both the nebulizing nozzle 15 and the pump(s) 13, 14 can be fixed to the same between the tubular mantle 50 and the flange 53.

In a further advantageous embodiment, not illustrated, the nebulizing nozzle 15 can be fixed to one between the tubular mantle 50 and the flange 53, and the pump(s) to the other between the tubular mantle 50 and the flange 53; in this case, in the advantageous embodiment in which the tubular mantle 50 is rotatable with respect to the flange 53, and the latter is advantageously fixed with respect to the cabinet 20, the pump(s) 13, 14 and the nebulizing nozzle 15 can be advantageously configured in such a way to be fluidly connected only when, depending on the rotation of the tubular mantle 50, the position of the nebulizing nozzle 15 has a specific relation with the position of the pump(s) 13, 14, for example when such components face one another and/or they are at a prefixed reciprocal distance. This can be obtained, for example, using one or more suitable valves, not illustrated, associated to the pump(s) 13, 14 and/or to the nebulizing nozzle 15, and configured for putting into fluid communication such components only when, depending on the rotation of the tubular mantle 50, the positions of the pump(s) 13, 14 and of the nebulizing nozzle 15 have a specific reciprocal relation, e.g. when such components face one another and/or they are at a prefixed reciprocal distance.

In further advantageous embodiments, like for example the ones illustrated in FIGS. 8, and 10 to 15, at least one pump 13 is configured for pumping a liquid 3 in a liquid container 16 fixed to the tubular mantle 50 or to the flange 53.

In advantageous embodiments, as in the examples of FIGS. 8, and 10 to 15, both the liquid container 16 and the pump 13 can be fixed to the same between the tubular mantle 50 and the flange 53.

In a further advantageous embodiment, not illustrated, the liquid container 16 can be fixed to one between the tubular mantle 50 and the flange 53, and the pump 13 to the other between the tubular mantle 50 and the flange 53; in this case, in the advantageous embodiment in which the tubular mantle 50 is rotatable with respect to the flange 53, and the latter is advantageously fixed with respect to the cabinet 20, the pump 13 can be advantageously configured in such a way to be fluidly connected to the liquid container 16 only when, depending on the rotation of the tubular mantle 50, the position of the liquid container 16 has a specific relation with the position of the pump 13, for example when such components face one another and/or they are at a prefixed reciprocal distance. This can be obtained, for example, using one or more suitable valves, not illustrated, associated to the pump 13 and/or to the liquid container 16, and configured for putting into fluid communication such components only when, depending on the rotation of the tubular mantle 50, the positions of the pump 13 and of the liquid container 16 have a specific reciprocal relation, e.g. when such components face one another and/or they are at a prefixed reciprocal distance.

Figure 12:
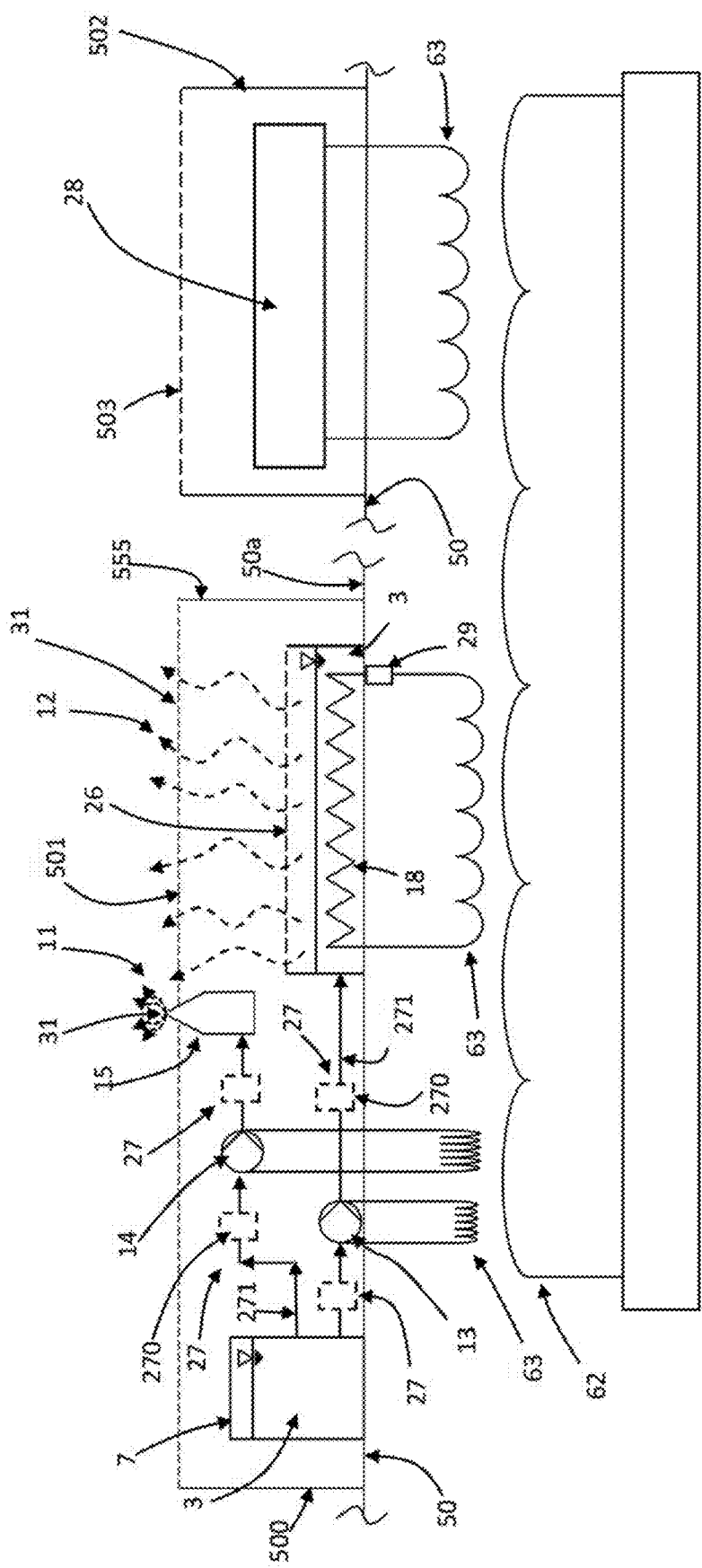
FIG. 12 is a schematic lateral view of a further advantageous embodiment of an electric liquid treating device of a laundry treating appliance according to the invention.
Figure 13:
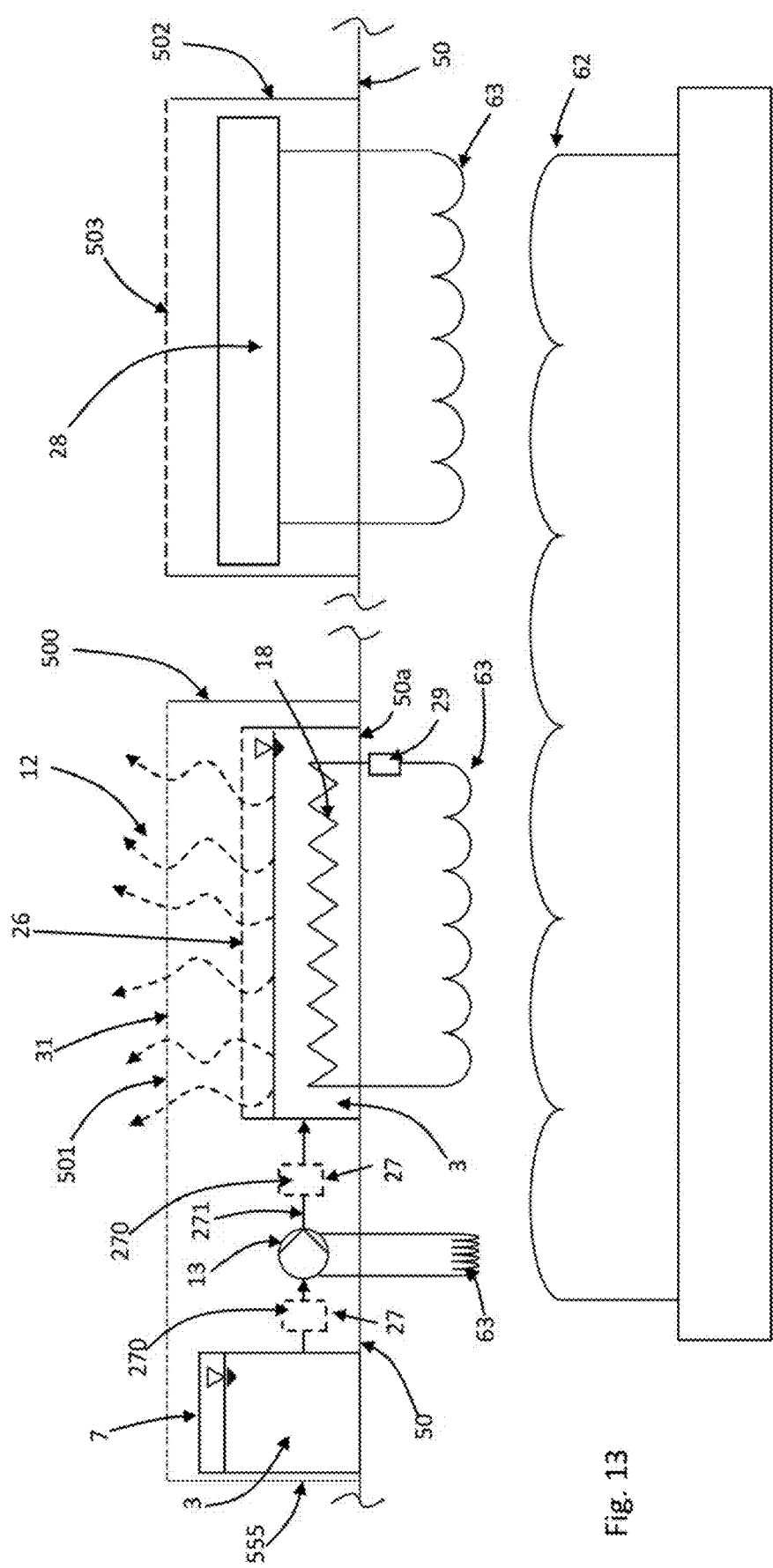
FIG. 13 is a schematic lateral view of a further advantageous embodiment of an electric liquid treating device of a laundry treating appliance according to the invention.

In advantageous embodiments, like for example the ones illustrated in FIGS. 11 and 12, the electric liquid treating device 200 comprises one or more pumps 13 configured for drawing a liquid 3 from the liquid reservoir 7 and pumping it in a liquid container 16, and one or more pumps 14 configured for pumping a liquid 3 in a nebulizing nozzle 15; such pumps 13 and 14 are advantageously connected in parallel one another, and they can be operated simultaneously or one at a time.

In advantageous embodiments, like for example the one illustrated in FIG. 10, a pump 13 is advantageously configured for pumping a liquid 3 in a three-way valve 17 configured for selectively directing this liquid 3 to a nebulizing nozzle 15 and/or to a liquid container 16.

Figure 8:
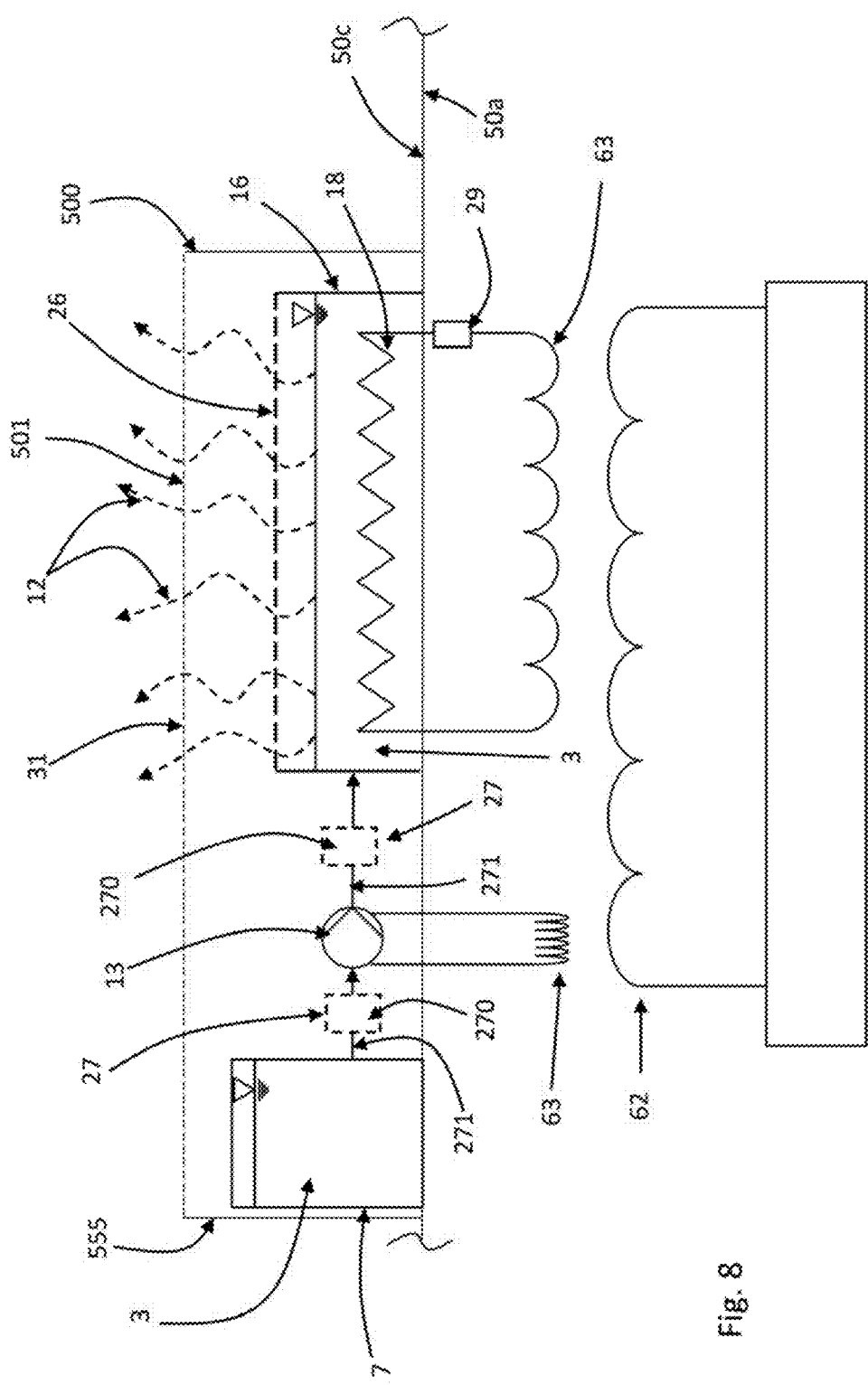
FIG. 8 is a schematic lateral view of a first advantageous embodiment of an electric liquid treating device of a laundry treating appliance according to the invention.

In advantageous embodiments, like for example the ones illustrated in FIGS. 8 and from 10 to 13, the electric liquid treating device 200 comprises an electric heating device 18, for example an electric heater, positioned within the liquid container 1) and configured for heating a liquid 3 contained therein until producing vapor 10. It is underlined that if the liquid 3 is water, the vapor 10 produced by heating such a liquid 3 is steam.

In advantageous embodiments, like for example the ones illustrated in FIGS. 8 and 10 to 13, the laundry treating appliance 10a, 10b advantageously comprises a temperature sensor 29 configured for sensing the temperature of a liquid contained within the liquid container 16.

Preferably, the control unit 60 is operatively connected to the temperature sensor 29 and is configured for controlling the heating device 18 depending on the temperature sensed by the temperature sensor 29.

Figure 14:
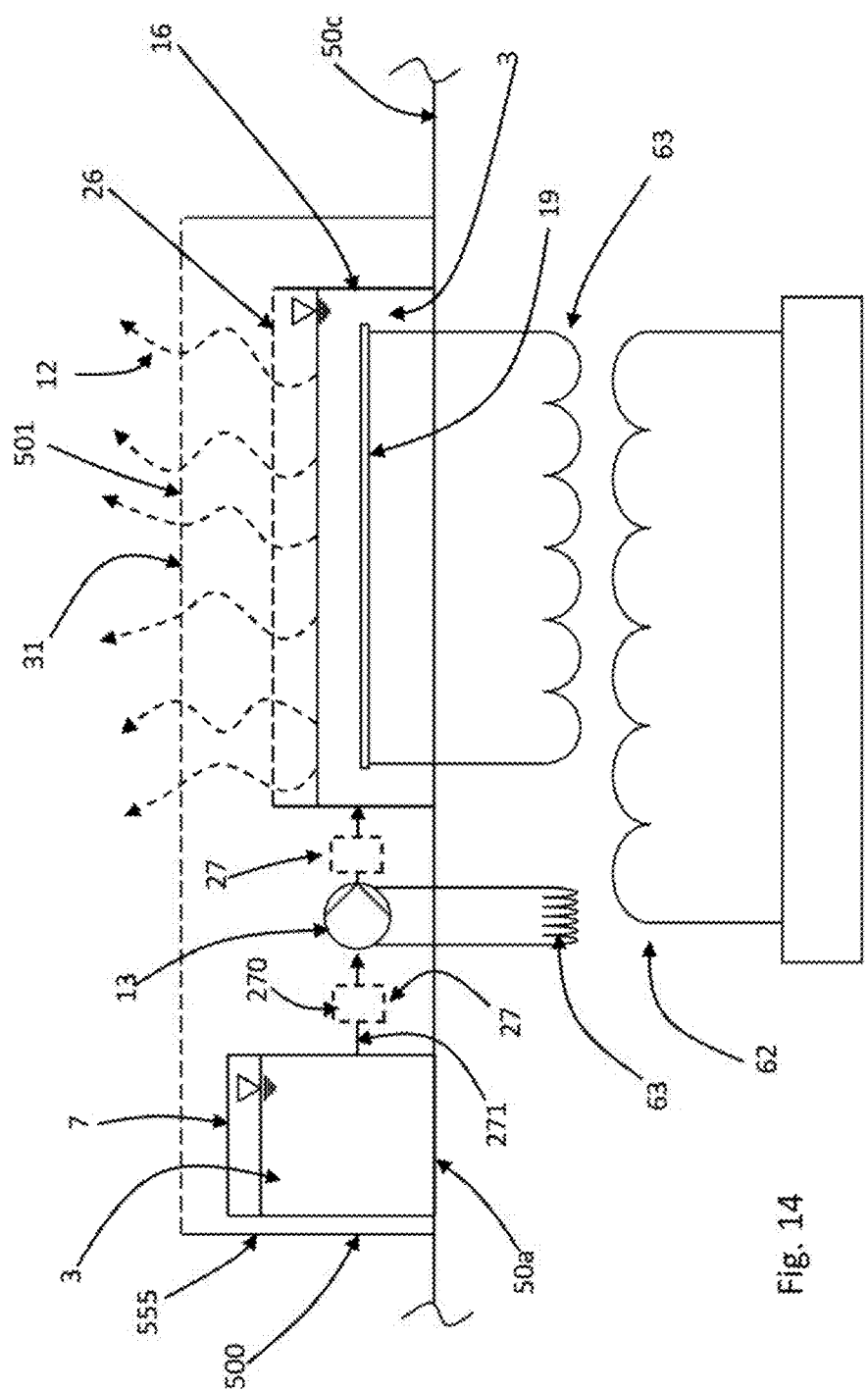
FIG. 14 is a schematic lateral view of a further advantageous embodiment of an electric liquid treating device of a laundry treating appliance according to the invention.

In further advantageous embodiments, like for example the one illustrated in FIG. 14, the electric liquid treating device 200 comprises a vibrating membrane 19 positioned within the liquid container 16 and configured for producing mist 11 by vibrating, preferably at ultrasonic frequency, within a liquid 3 contained in such liquid container 16.

Figure 15:
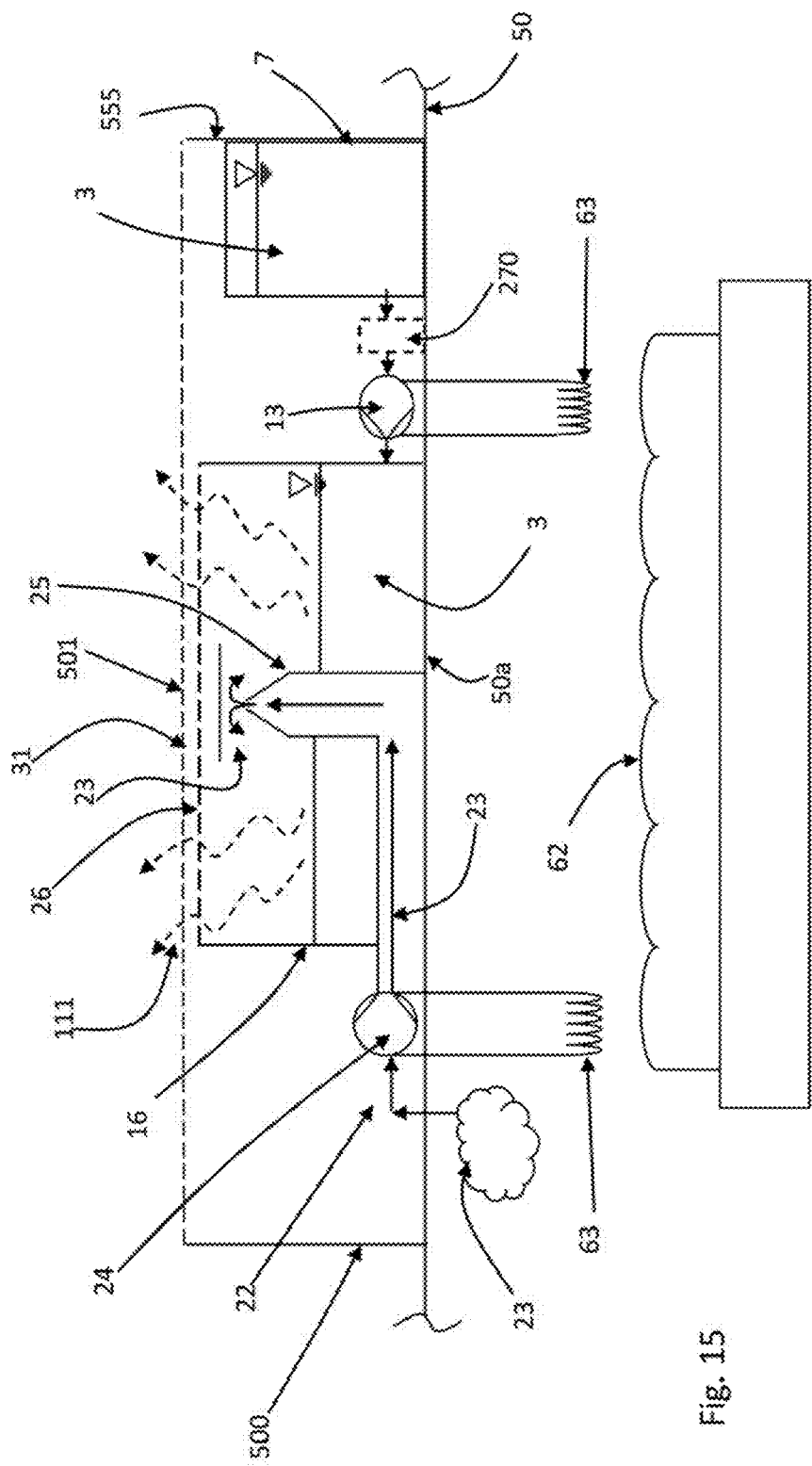
FIG. 15 is a schematic lateral view of a further advantageous embodiment of an electric liquid treating device of a laundry treating appliance according to the invention.

In a further advantageous embodiment, like the one illustrated for example in FIG. 15, the electric liquid treating device 200 comprises an aerosol generating device 22 configured for pumping air 23 within the liquid container 16 in such a way to generate an aerosol 111 within the latter.

Preferably, like in the example illustrated in FIG. 15, the aerosol generating device 22 comprises a compressor 24, fixed to the tubular mantle 50 or to the flange 53 and configured for pumping compressed air 23 to a suitable air nozzle 25 configured for supplying such air 23 to a liquid 3 contained in the liquid container 16, in such a way to produce an aerosol 111.

In a further advantageous embodiment, not illustrated, the laundry treating device 200 can comprise two or more between and electric heating device 18, a vibrating membrane 19, an aerosol generating device 22, associated to the same liquid container 16 or to different liquid containers fixed to the tubular mantle 50 or to the flange 53 (all of them to the tubular mantle 50 or to the flange 53, or one or some of them to the flange 53 and one or some of them to the tubular mantle 50).

Advantageously, the liquid container 16 comprises one or more apertures and/or perforated surfaces 26 through which vapor 10 and/or mist 11 and/or aerosol 111 contained within the liquid container 16 can exit the latter.

In advantageous embodiments, like the ones illustrated in attached figures, the liquid reservoir 7 and/or the electric liquid treating device 200 is partially or totally contained within the hollow body 555 of the lifter 500.

Advantageously, as in the examples illustrated in attached figures, both the liquid reservoir 7 and the electric liquid treating device 200 are totally contained in the hollow body 555 of the same lifter 500; in further advantageous embodiments, not illustrated, the liquid reservoir 7 and the electric liquid treating device 200 can be partially or totally contained in hollow bodies 555 of different lifters, or one of them can be partially or totally contained in a hollow body 555 of a lifter 500, and the other can be not contained in the hollow body 555 of a lifter 500.

In advantageous embodiments, like for example the ones illustrated in attached figures, one or more pumps 13, 14, preferably all of them, are partially or totally contained within the hollow body 555 of a lifter 500, preferably of the same lifter 500.

In advantageous embodiments, like for example the ones illustrated in FIGS. 8 and from 10 to 15, the liquid container 16 is partially or totally contained within the hollow body 555 of a lifter 500.

In further advantageous embodiments, not illustrated, the liquid container 16 is defined by the hollow body 555 or by a portion thereof.

Advantageously, the hollow body of the lifter 500 comprises a perforated surface 501 through which mist 11 and/or vapor 10 and/or aerosol 16 contained in the hollow body 555 can be released into the inner volume 55 delimited by the tubular mantle 50.

In advantageous embodiments, like for example the ones illustrated in attached figures, the laundry treating appliance 10a, 10b comprises a conditioning device 27 fixed to the tubular mantle 50 or to the flange 53 and configured for adding a conditioning substance (for example a fragrance) to the liquid 3 before the latter is turned into mist 11 and/or vapor 10 and/or aerosol 111.

Preferably, the conditioning device 27 comprises a conditioning substance reservoir 270 configured for receiving the conditioning substance and crossed by a conduit 271 in which the liquid 3 flows before being turned into mist 11 and/or vapor 10 and/or aerosol 111, in such a way that this liquid 3 mixes with the conditioning substance contained in the conditioning substance reservoir 270 before being turned into mist 11 and/or vapor 10 and/or aerosol 111.

Advantageously, the conditioning substance reservoir 270 can be fluidly connected upstream or downstream of the pump(s) 13, 14.

In a further advantageous embodiment, the laundry treating appliance can comprise a plurality of conditioning substance reservoirs 270, one or some of them being connected upstream of the pump 13, 14, and one or some of them connected downstream of the pump 13, 14.

In attached figures, a plurality of conditioning substance reservoirs 270 are illustrated, each one depicted in dotted line to indicate that it can be present or not.

In advantageous embodiments, like the ones illustrated for example in FIGS. 12 and 13, the laundry treating appliance 10*a*, 10*b* comprises a light generating source 28 fixed to the tubular mantle 50 or to the flange 53 and configured for emitting light within the tubular mantle 50.

The light generating source 28 can be fixed to the outer surface 50*a* or to the inner surface 50*c* of the tubular mantle 50, or to the external surface 53*a* or to the internal surface 53*b* of the flange 53.

In an advantageous embodiment, not illustrated, in which the light generating source 28 is fixed to the outer surface 50*a* of the tubular mantle 50 or to the external surface 53*a* of the flange 53, such surface must comprise at least a portion, not illustrated, transparent to the light generated by the light generating source 28, so that this light can enter the inner volume 55 of the tubular mantle 50.

Preferably, the light generating source 28 is controlled by the control unit 60.

Preferably, the light generating source 28 is an ultraviolet light generating source; the emitted ultraviolet light has an antibacterial effect on the laundry contained in the inner volume 55.

More preferably, the control unit 60 is configured for controlling the light generating source 28 and the electric liquid treating device 200 in such a way that the light generating source 28 emits light within the inner volume 55 of the tubular mantle 50 during and/or after the release of mist 11 and/or vapor 10 and/or aerosol 16 within the inner volume 55 of the tubular mantle 50.

In a further advantageous embodiment, the light generating source 28 is configured for generating a light at more than one frequency; in this case, the control unit 60 can be preferably configured for controlling the light generating source 28 and the electric liquid treating device 200 in such a way that the light generating source 28 emits light at a frequency that depends on the operating status of the electric liquid treating device 200 and/or of the laundry treating appliance 10*a*, 10*b*.

Preferably, but not necessarily, the light generating source 28 is housed at least partially within the hollow body 555 of a lifter; this lifter can be the same lifter 500 in which a liquid treating device 200 is housed, or a further lifter 502 provided within the tubular mantle 50; in this case, the hollow body 555 of the lifter (500 or 502) in which the light generating source 28 is housed comprises a wall 503, or a portion thereof, which is transparent to the light emitted by the light generating source 28.

In advantageous embodiments, like for example the ones illustrated in attached figures, the mist 11 and/or vapor 10 and/or aerosol 111 is released within the tubular mantle 50 through one or more outlets 31 rotating together with the tubular mantle 50, and the laundry treating appliance 10*a*, 10*b* comprises a sensor system 32 configured for detecting a data related to the position of at least one of the one or more outlets 31 with respect to a horizontal surface 2 (e.g. the floor of a room) on which the laundry treating appliance 10a, 10b is configured to lay.

Preferably, the sensor system 32 is or comprises an accelerometer or gyroscope rotating together with the tubular mantle 50, and/or comprises an encoder configured for detecting the angular position of a prefixed reference point, not illustrated, of the tubular mantle 50.

Advantageously, the sensor system 32 is in signal communication with the control unit 60.

Preferably, the control unit 60 is configured for activating the electric liquid treating device 200 and releasing mist 11 and/or vapor 10 and/or aerosol 111 within the tubular mantle 50 when the position of at least one of the one or more outlets 31 corresponds to a prefixed position.

More preferably, the prefixed position is a position in which at least one outlet 31 is positioned, with respect to the horizontal surface 2 on which the laundry treating appliance 10a, 10b lays, above a plane 33 (shown for example in schematic FIGS. 20 to 23) including the rotation axis Ax of the tubular mantle 50 and inclined, with respect to the horizontal surface 2, of the same angle as the rotation axis Ax.

Figure 20:
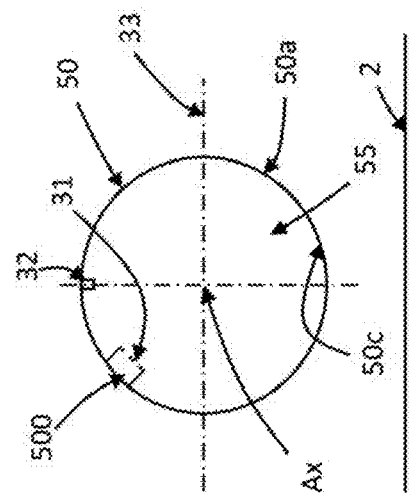
FIG. 20 is a schematic lateral view of a tubular mantle of an advantageous embodiment of laundry treating appliance according to the invention.
Figure 21:
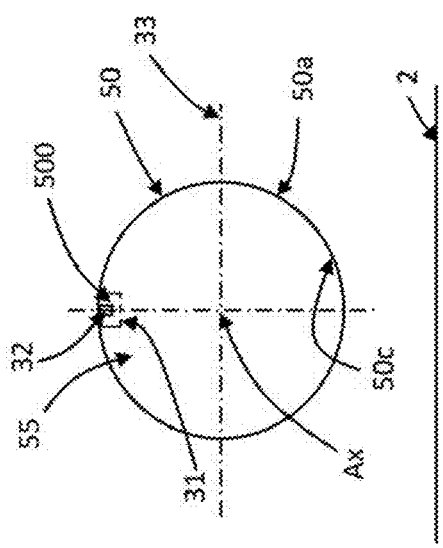
FIG. 21 is a cross section operated according to plane XXI-XXI of FIG. 20.

For example, FIGS. 20 and 21 schematically show a lateral view (FIG. 20) and a cross section (FIG. 21) of a tubular mantle 50 rotatable with respect to a horizontal rotation axis Ax; in this case the plane 33 is horizontal.

Figure 22:
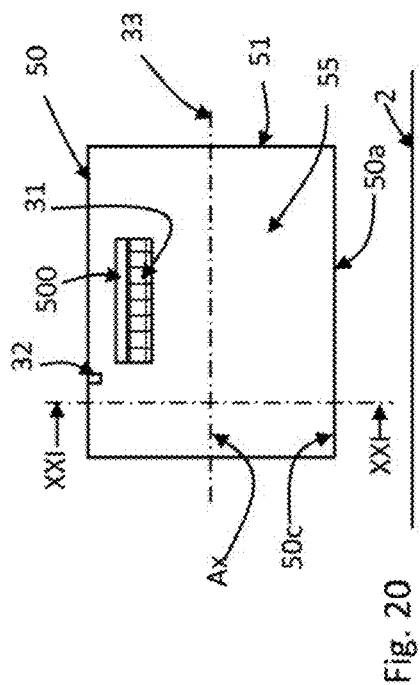
FIG. 22 is a schematic lateral view of a tubular mantle of a further advantageous embodiment of laundry treating appliance according to the invention.
Figure 23:
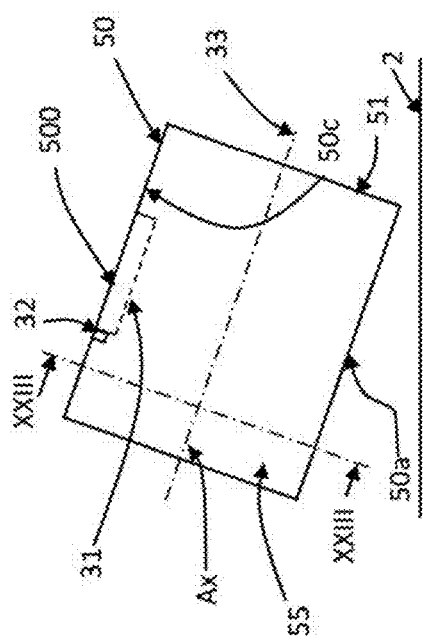
FIG. 23 is a cross section operated according to plane XXIII-XXIII of FIG. 22.

FIGS. 22 and 23 schematically show a lateral view (FIG. 23) and a cross section (FIG. 24) of a tubular mantle 50 rotatable with respect to a rotation axis Ax which is slightly inclined; in this case the plane 33 is inclined as the rotation axis Ax.

Still more preferably, the prefixed position is a position in which at least one outlet 31 is positioned at its higher position with respect to the horizontal surface 2 on which the laundry treating appliance 10a, 10b lays; such position is illustrated, for example, in FIGS. 22 and 23.

In advantageous embodiments, like for example the ones illustrated in FIGS. 1 to 15, the laundry treating appliance 10a, 10b can comprise a wireless power transmitter unit 62 associated to a non-rotating part of the laundry treating appliance 10a, 10b, and arranged for wireless transmitting electric power to a wireless power receiver unit 63 rotating with the tubular mantle 50; the wireless power receiver unit 63 is preferably configured for supplying electric power to the electric liquid treating device 200.

In the advantageous embodiment in which the laundry treating appliance is a washing machine 10b, or a washer-drier, the non-rotating part to which the wireless power transmitter unit 62 is associated can be, for example, the washing tub 30, preferably the frontal wall 30a or the rear wall 30b of the latter.

In the advantageous embodiment in which the laundry treating appliance is a tumble drier 10a, the non-rotating part to which the wireless power transmitter unit 62 is associated can be, for example, an inner frontal wall 34 of the housing 20 facing the tubular mantle 50 on the opposite side of the flange 53, or, in case the flange 53 is static with respect to the cabinet 20, the not-rotating part can advantageously be the flange 53, or a further wall fixed to the latter.

Preferably, the electric liquid treating device 200 is wired connected to the wireless power receiver unit 63.

Preferably, the wireless power receiver unit 63 is arranged for supplying electric power (preferably by a wired electric connection) to one or more pumps 13, 14.

Preferably, the wireless power receiver unit 63 is arranged for supplying electric power (preferably by a wired electric connection) to the electric heating device 18, if present.

Preferably, the wireless power receiver unit 63 is arranged for supplying electric power (preferably by a wired electric connection) to the vibrating membrane 19, if present.

Preferably, the wireless power receiver unit 63 is arranged for supplying electric power (preferably by a wired electric connection) to the compressor 24, if present.

Preferably, the wireless power receiver unit 63 is arranged for supplying electric power (preferably by a wired electric connection) to the light generating source 28, if present.

Preferably, the wireless power receiver unit 63 is arranged for supplying electric power (preferably by a wired electric connection) to the three-way valve 17, if present.

Advantageously, the wireless power transmitter unit 62 is electrically connected to an electrical system, schematically depicted in attached figures as a square 65, of the laundry treating appliance 10a, 10b, electrically connected or connectable to electric means, not illustrated, external to the latter.

Figure 5:
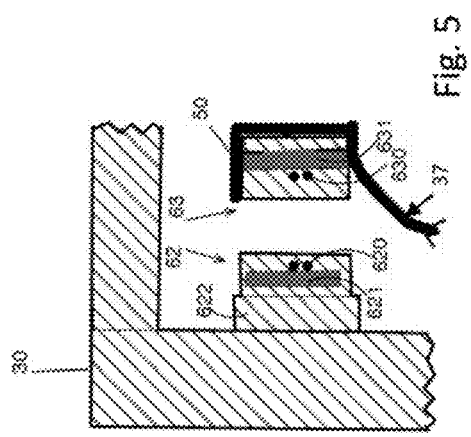
FIG. 5 is a sectional view of a detail of a possible advantageous embodiment of a wireless transmitter power unit and a wireless receiver power unit of a laundry treating appliance according to the invention.

In an advantageous embodiments, the power transmitter unit 62 and the power receiver unit 63 are positioned, one opposite to the other, fixed respectively to the not-rotating part of the laundry treating appliance 10a, 10b and to the tubular mantle 50, or to an element rotating with the latter (for example, as shown in FIG. 5, a further annular flange 37 fixed to the tubular mantle 50 on the opposite side of the flange 53), parallel one another, and to a plane perpendicular to the rotation axis Ax of the tubular mantle 50.

Figure 6:
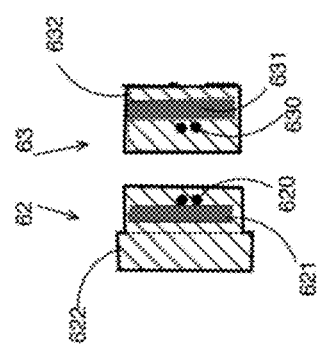
FIG. 6 is a sectional view showing more in detail an advantageous embodiment of the fixation of the wireless power transmitter unit and the wireless power receiver unit.

In advantageous embodiments, like for example the ones illustrated in FIGS. 5 and 6, the wireless power transmitter unit 62 comprises a transmission coil 620 generating a magnetic field and the wireless power receiver unit 63 comprises a reception coil 630 generating power from the magnetic field generated by the transmission coil 620 and supplying the generated power to the electric liquid treating device 200.

Preferably, the transmission coil 620 and the reception coil 630 are integrated, respectively, into an enclosing material 622, 632.

Preferably, the transmission coil 620 and the reception coil 630 are aligned, centered and parallel one another, and to a plane perpendicular to the rotation axis Ax of the tubular mantle 50.

In advantageous embodiments, the transmission coil 620 and the reception coil 630 have a common radius dimension, approximately equal to the tubular mantle 50 external radius and are distanced in axial direction by a distance lower than their radius. Preferably, the transmission coil 620 and the reception coil 630 are distanced in axial direction by a distance lower than 10 cm. More preferably, the transmission coil 620 and the reception coil 630 are distanced in axial direction by a distance lower than 5 cm.

Figure 4:
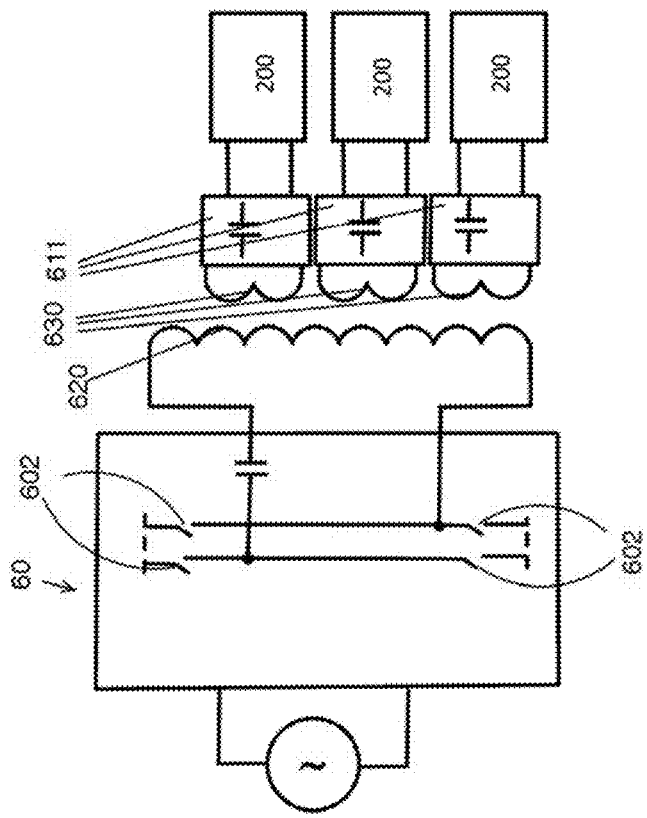
FIG. 4 is a block diagram of a second advantageous embodiment of a power supply circuit of the electric liquid treating device(s) of a laundry treating appliance according to the invention.
Figure 3:
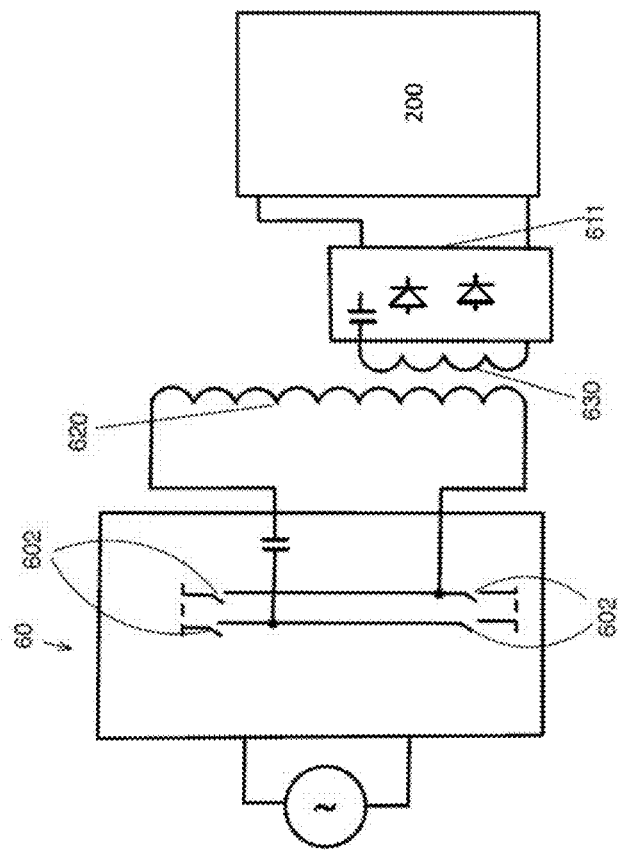
FIG. 3 is a block diagram of a first advantageous embodiment of a power supply circuit of the electric liquid treating device(s) of a laundry treating appliance according to the invention.
Figure 7:
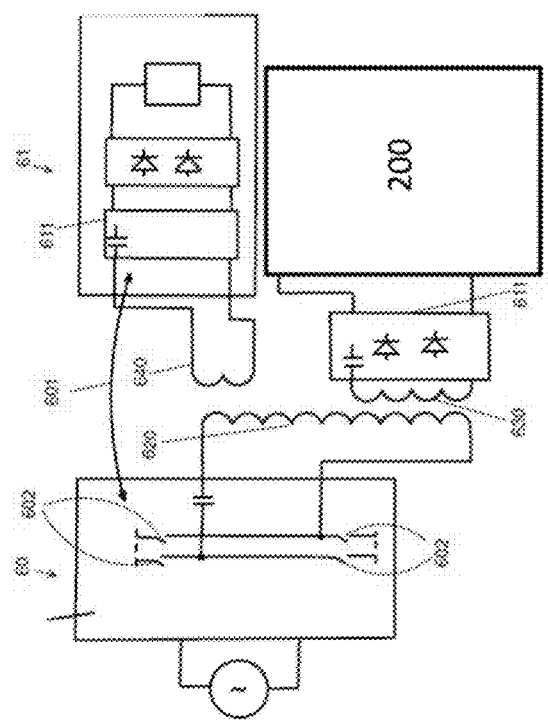
FIG. 7 is block diagram of another advantageous embodiment of a power supply circuit of the electric liquid treating device of a laundry treating appliance, including an interface unit.

As shown for example in the advantageous embodiment of FIGS. 5 to 7, in the control unit 60 an oscillating voltage can be generated by switching elements 602, that are electrically connected to the transmission coil 620 of the wireless power transmitter unit 62 coupled to the reception coil 630 of the wireless power receiver unit 63. The voltage induced in the coil 630 can be preferably rectified and conditioned in a coil interface block 611, and can be preferably brought, preferably with wires, to one more electric liquid treating device 200 (if they are more than one, they can be preferably, but not necessarily, electrically connected one another in parallel). Preferably, the components of the interface block 611 could be integrated in the power receiver unit 63.

In the advantageous embodiment of FIG. 7, the laundry treating appliance advantageously comprises also an interface unit 61 that can be supplied by a dedicated reception coil 640 of the receiver unit 63, or could be connected in parallel to the reception coil 630 supplying the electric liquid treating device(s) 200.

The interface unit 61 has preferably a wireless connection 601 to transfer measurement data to the control unit 60.

In advantageous embodiments, like for example the ones illustrated in FIGS. 5 and 6, the wireless power receiver unit 63 comprises a receiver magnetic shielding member 631, and the wireless power transmitter unit 62 comprises a transmission magnetic shielding member 621.

Preferably, the receiver magnetic shielding member 631 is positioned between the reception coil 630 and the tubular mantle 50 side, and the transmission magnetic shielding member 621 is positioned between said transmission coil 620 and the not rotating part side.

Advantageously, the receiver magnetic shielding member 631 is positioned on the opposite side of the reception coil 630 with respect to the wireless power transmitter unit 62.

Preferably, the transmission magnetic shielding member 621 is positioned on the opposite side of said transmission coil 620 with respect to the wireless power receiver unit 63.

Figure 16:
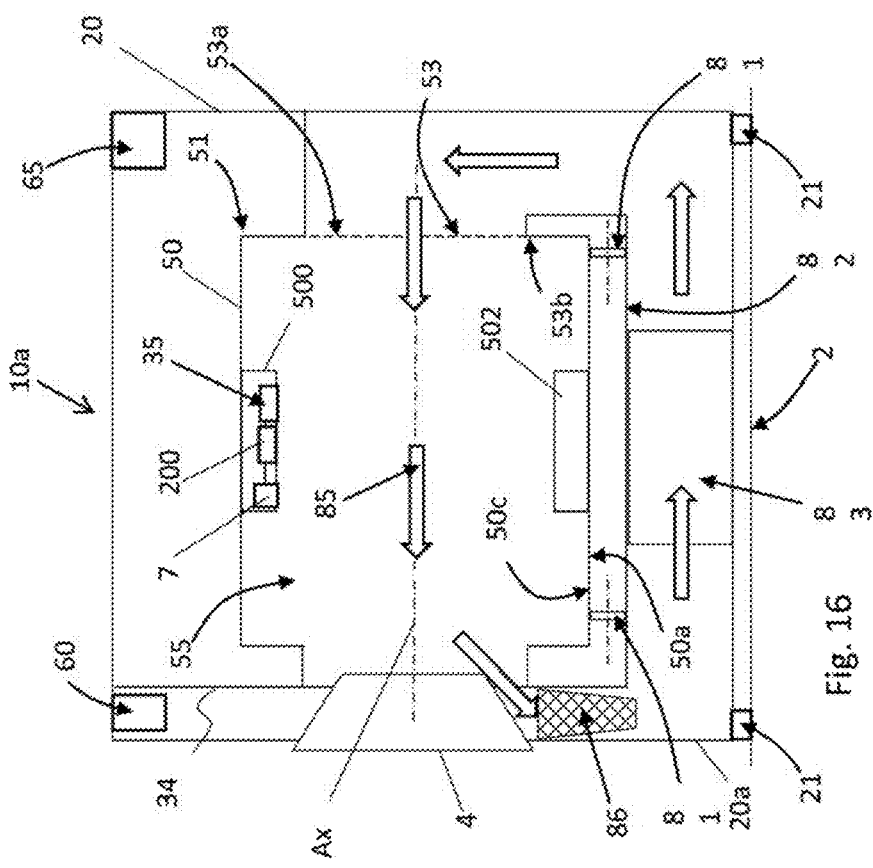
FIG. 16 is a sectional view of a further advantageous embodiment of a laundry treating appliance, in particular a tumble direr, according to the invention.

In a further advantageous embodiment, illustrated for example in FIGS. 16 and 17, the laundry treating appliance 10a, 10b comprises a battery or battery pack 35 fixed to the tubular mantle 50 or to the flange 53 and configured for supplying electric power to the electric liquid treating device 200.

Preferably, the battery or battery pack 35 is fixed to the tubular mantle 50 or to the flange 53, and the electric liquid treating device 200 is fixed to the same tubular mantle 50 or flange 53 to which the battery or battery pack 35 is fixed.

Advantageously, the battery or battery pack 35 can be provided alternatively or in addition to a system comprising the wireless power transmitter unit 62 and the wireless power receiver unit 63 as the one described for example with reference to FIGS. 1 to 15.

In a further advantageous embodiment, illustrated for example in FIGS. 18 and 19, the laundry treating appliance 10a, 10b comprises a sliding electric contact system 36, electrically connected to the electrical system 65 of the laundry treating appliance 10a, 10b, and configured for supplying electric power to the electric liquid treating device 200 from non-rotating part (e.g. the housing 20) of the laundry treating appliance 10a, 10b.

Advantageously, the sliding electric contact system 36 can be provided alternatively or in addition to system comprising a wireless power transmitter unit 62 and a wireless power receiver unit 63 as the one described for example with reference to FIGS. 1 to 15 and/or to a battery or battery pack 35 as the one described for example with reference to FIGS. 16 and 17.

The functioning of the laundry treating appliance 10a, 10b according to the invention will be described in the following only in relation to the functioning of the electric liquid treating device 200.

After a liquid 3 has been loaded in the liquid reservoir 7, the laundry can be loaded in the inner volume 55 of the tubular mantle 50.

Advantageously, the electric liquid treating device 200 can be activated during a washing (if the laundry treating appliance is a washing machine 10b, or washer-drier) or a drying (if the laundry treating appliance is a tumble direr 10a or washer-drier) process, or it can be activated in a dedicated process, for example, but not only, configured for releasing mist 11 and/or vapor 10 and/or aerosol 111 against laundry which is already clean or dry, for example for refreshing it and/or for disinfecting it, and/or for exerting an anti-crease effect on such a laundry.

Advantageously, the electric liquid treating device 200 can be activated also when the inner volume 55 of the tubular mantle 50 is empty, for example for releasing vapor and disinfecting the tubular mantle 50, and/or preventing the growth of bacteria.

Preferably, after the laundry is loaded in the inner volume 55 of the tubular mantle 50, the electric liquid treating device 200 is activated for releasing mist 11 and/or vapor 10 and/or aerosol 111 only when the position, detected by the sensor system 32, of at least one of the outlets 31 through which the mist 11 and/or vapor 10 and/or aerosol 111 is released, corresponds to a prefixed angular position, preferably a position above plane 33, more preferably corresponding to the higher position of such an outlet 31 with respect to the horizontal surface 2 on which the laundry treating appliance 10a, 10b lays. This prevents that the outlet 31 is obstructed by the laundry, since the latter lays below such an outlet 31.

According to the specific embodiment of the electric liquid treating device 200 or electric liquid treating devices 200 present in the laundry treating appliance 10, 10b, and/or to the specific treatment to apply to the laundry and/or to the tubular mantle 50 and/or to the flange 53, one or more of mist 11 and/or vapor 10 and/or aerosol 111 can be released.

If the laundry treating appliance is provided with the conditioning device 27, a conditioning substance (e.g. a fragrance) can be added to the liquid before turning it into mist 11 and/or vapor 10 and/or aerosol 111.

If the laundry treating appliance is advantageously provided with the light generating source 28, and the control unit 60 is advantageously configured for controlling the light generating source 28 and the electric liquid treating device 200 in such a way that the light generating source 28 emits light within the inner volume 55 of the tubular mantle 50 during and/or after the release of mist 11 and/or vapor 10 and/or aerosol 16 within the inner volume 55 of the tubular mantle 50, it is possible emitting light, for example ultraviolet light, within the inner volume 55 of the tubular mantle 50, for example during the release of vapor 10 (and/or also during the release of mist 11 and/or of aerosol 111), so as to obtain a synergic disinfecting effect.

If the light generating source 28 is advantageously configured for generating a light at more than one frequency, and the control unit 60 is advantageously configured for controlling the light generating source 28 and the electric liquid treating device 200 in such a way that the light generating source 28 emits light at a frequency that depends on the operating status of the electric liquid treating device 200 and/or of the laundry treating appliance 10a, 10b, it is possible, for example, using an ultraviolet frequency during the supply of vapor, so as to increase the disinfecting effect; in addition, a visible frequency can be preferably used during the load of the laundry, so as to better see the internal of the inner volume.

It is seen therefore how the invention achieves the proposed aim and objects, there being provided a laundry treating appliance that allows producing vapor and/or mist and/or aerosol within or very close to the inner volume of the tubular mantle, increasing in this way the probability of effectively contacting all the laundry with such a vapor and/or mist and/or aerosol, reducing the risk that part of such vapor and/or mist and/or aerosol could condense or become less effective before reaching the laundry, and reducing also the liquid and energy consumption for producing such a vapor and/or mist and/or aerosol with respect to cited prior art. In addition, fixing the liquid reservoir and the electric liquid treating device to the tubular mantle and/or to the flange, allows reducing the complexity of the appliance, and organizing the space within the cabinet in a more rational and effective way.

In addition, the invention does not require, in order to be implemented, a specific design or a specific thermal and/or electric insulation of the door or porthole of the laundry treating appliance.

REFERENCE NUMBERS rotation axis Ax
horizontal surface 2
liquid 3
loading/unloading door 4
motor 5
shaft 6
liquid reservoir 7
laundry treating appliance 10a, 10b
tumble drier 10a
washing machine 10b
mist 11
vapor 12
pumps 13, 14
nebulizing nozzle 15
liquid container 16
three-way valve 17
electric heating device 18
vibrating membrane 19
cabinet/housing 20
front wall 20a
feet 21
aerosol generating device 22
air 23
compressor 24
air nozzle 25
apertures and/or perforated surfaces 26
conditioning device 27
light generating source 28
plane 33
temperature sensor 29
tub 30
frontal wall 30a
rear wall 30b
outlets 31
sensor system 32
inner frontal wall 34
battery/battery pack 35
sliding electric contact system 36
tubular mantle 50
outer surface 50a
inner surface 50c
first end 51
flange 53
external surface 53a
internal surface 53b
drum 54
inner volume 55
sealing element 56
control unit 60
interface unit 61
wireless power transmitter unit 62
wireless power receiver unit 63
electrical system 65
rollers 81
supporting structure 82
air heating device 83
air 85
aerosol 111
electric liquid treating device 200
conditioning substance reservoir 270
conduit 271
lifter 500
perforated surface 501
further lifter 502
wall 503
hollow body 555 wireless connection 601
switching elements 602
coil interface block 611
transmission coil 620
transmission magnetic shielding member 621
reception coil 630
enclosing material 622, 632
receiver magnetic shielding member 631
reception coil 640

The invention claimed is:

1. A laundry treating appliance comprising:
a cabinet;
a tubular mantle housed inside the cabinet and rotatable with respect to a rotation axis, the tubular mantle comprising a first end and an inner volume configured to receive laundry;
a flange fixed to and rotatable with the tubular mantle, wherein the first end of the tubular mantle is at least partially closed by the flange;
a liquid reservoir fixed to the tubular mantle or to the flange and defining an interior space configured to contain a liquid;
an electric liquid treating device fixed to the tubular mantle or to the flange, and fluidly connected with the liquid reservoir and configured to receive and treat the liquid to thereby release, within the tubular mantle, at least one of a vapor, a mist, or an aerosol; and
a power source configured to supply electric power to the electric liquid treating device from a non-rotating part of the laundry treating appliance, wherein the power source is selected from a group consisting of a sliding electric contact system and a wireless power transmitter unit, and wherein the wireless power transmitter unit is configured to wirelessly transmit electric power to a wireless power receiver unit rotating with the tubular mantle.

2. The laundry treating appliance according claim 1, wherein the tubular mantle comprises a lifter protruding into the inner volume and having a hollow body, and the liquid reservoir and the electric liquid treating device are mounted on or at least partially inside the hollow body.

3. The laundry treating appliance according to claim 1, wherein the electric liquid treating device comprises one or more pumps fluidly connected to the liquid reservoir and configured for drawing the liquid from the liquid reservoir and pumping it in a different region.

4. The laundry treating appliance according to claim 3, wherein at least one pump of the one or more pumps is configured for pumping the liquid through a nebulizing nozzle fixed to the tubular mantle or to the flange to thereby inject mist within the tubular mantle.

5. The laundry treating appliance according to claim 3, wherein at least one pump of the one or more pumps is configured for pumping the liquid to a liquid container fixed to the tubular mantle or to the flange.

6. The laundry treating appliance according to claim 5, wherein the electric liquid treating device further comprises an electric heater positioned within the liquid container and configured for heating the liquid contained therein until producing vapor.

7. The laundry treating appliance according to claim 6, wherein the electric liquid treating device further comprises a temperature sensor configured to sense a temperature of the liquid in the liquid container, and a control unit configured to control the electric heater depending on the temperature.

8. The laundry treating appliance according to claim 5, wherein the electric liquid treating device further comprises a vibrating membrane positioned within the liquid container and configured for producing mist by vibrating the liquid contained in the liquid container.

9. The laundry treating appliance according to claim 5, wherein the electric liquid treating device further comprises an aerosol generating device configured for pumping air into the liquid container to generate an aerosol.

10. The laundry treating appliance according to claim 5, wherein the liquid container comprises one or more apertures and/or perforated surfaces through which vapor and/or mist and/or aerosol contained within the liquid container can exit the liquid container.

11. The laundry treating appliance according to claim 3, wherein at least one of the one or more pumps is configured for pumping the liquid to a three-way valve configured for selectively directing the liquid to a nebulizing nozzle configured for injecting mist within said tubular mantle, and/or to a liquid container fixed to the tubular mantle or to the flange.

12. The laundry treating appliance according to claim 1, wherein the electric liquid treating device comprises an electric heating device configured for heating the liquid until producing vapor.

13. The laundry treating appliance according to claim 1, wherein the electric liquid treating device comprises a vibrating membrane to vibrate the liquid to produce a mist.

14. The laundry treating appliance according to claim 13, wherein the vibrating membrane is configured to vibrate at an ultrasonic frequency.

15. The laundry treating appliance according to claim 1, wherein the electric liquid treating device comprises an aerosol generating device configured for pumping air into said liquid to generate an aerosol.

16. The laundry treating appliance according to claim 1, further comprising a conditioning device fixed to the tubular mantle or to the flange, wherein the conditioning device is configured to add a conditioning substance to the liquid before the liquid is turned into mist and/or vapor and/or aerosol.

17. The laundry treating appliance according to claim 16, wherein the conditioning device comprises a conditioning substance reservoir configured for receiving a conditioning substance and crossed by a conduit in which the liquid flows before being turned into mist and/or vapor and/or aerosol, in such a way that the liquid mixes with the conditioning substance before being turned into mist and/or vapor and/or aerosol.

18. The laundry treating appliance according to claim 1, further comprising a light generating source fixed to the tubular mantle or to the flange and configured for emitting light within the tubular mantle.

19. The laundry treating appliance according to claim 18, wherein the light generating source is configured to generate ultraviolet light or to generate light at more than one frequency.

20. The laundry treating appliance according to claim 19, wherein the light generating source is housed at least partially within a hollow lifter protruding into the inner volume of the tubular mantle, and wherein the lifter comprises a window that is transparent to the light emitted by the light generating source.

21. The laundry treating appliance according to claim 1, wherein the laundry treating appliance comprises a control unit configured for managing one or more operations of the laundry treating appliance, and wherein the electric liquid treating device is controlled by the control unit.

22. The laundry treating appliance according to claim 1, wherein:
the tubular mantle comprises one or more outlets fixed for rotating together with the tubular mantle, the one or more outlets being configured to pass the at least one of the vapor, the mist or the aerosol to the within the tubular mantle;
wherein the laundry treating appliance comprises a sensor system configured for detecting a data related to the position of at least one of the one or more outlets with respect to a horizontal surface on which the laundry treating appliance is configured to lay.

* * * * *